US012021303B2

(12) United States Patent
Shao et al.

(10) Patent No.: US 12,021,303 B2
(45) Date of Patent: Jun. 25, 2024

(54) ANTENNA, ANTENNA MODULE, AND WIRELESS NETWORK DEVICE

(71) Applicant: HUAWEI TECHNOLOGIES CO., LTD., Guangdong (CN)

(72) Inventors: Jinjin Shao, Wuhan (CN); Dongwei Wu, Wuhan (CN); Cao Shi, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 194 days.

(21) Appl. No.: 17/865,722

(22) Filed: Jul. 15, 2022

(65) Prior Publication Data

US 2022/0352645 A1 Nov. 3, 2022

Related U.S. Application Data

(63) Continuation of application No. PCT/CN2020/116601, filed on Sep. 21, 2020.

(30) Foreign Application Priority Data

Jan. 17, 2020 (CN) ......................... 202010055034.6

(51) Int. Cl.
*H01Q 1/36* (2006.01)
*H01Q 9/28* (2006.01)
(Continued)

(52) U.S. Cl.
CPC ............. *H01Q 19/17* (2013.01); *H01Q 9/285* (2013.01); *H01Q 21/08* (2013.01)

(58) Field of Classification Search
CPC ........ H01Q 19/17; H01Q 9/285; H01Q 21/08; H01Q 1/38; H01Q 15/142; H01Q 15/16;
(Continued)

(56) References Cited

U.S. PATENT DOCUMENTS 6,441,740 B1 8/2002 Brady et al.
7,023,909 B1 * 4/2006 Adams ................. H01Q 1/2275
343/907

(Continued)

FOREIGN PATENT DOCUMENTS

CN 201820881 U 5/2011
CN 201820881 U * 5/2011

(Continued)

OTHER PUBLICATIONS

Jiang Shouliang, Deployment Mechanism and Experiment of Dongfanghong-3 Satellite Communication Antenna, Space Electronic Technology, Issue 03, 1994, with an English Abstract, 6 pages.

(Continued)

*Primary Examiner* — Hai V Tran
*Assistant Examiner* — Bamidele A Immanuel
(74) *Attorney, Agent, or Firm* — WOMBLE BOND DICKINSON (US) LLP

(57) ABSTRACT

This application discloses an antenna, including a first antenna and a second antenna. The first antenna includes a first radiating element and a reflector. The reflector is located between the second antenna and the first radiating element. The reflector includes a connection part and a tooth part. The tooth part includes a plurality of comb teeth that are disposed side by side and that extend from the connection part toward the first radiating element. A gap is disposed between adjacent ones of the plurality of comb teeth. The tooth part further includes a profile facing the first radiating element. Each comb tooth includes an end part facing the first radiating element. The profile includes a concave part that is concave to the connection part.

20 Claims, 19 Drawing Sheets

(51) Int. Cl.
*H01Q 19/17* (2006.01)
*H01Q 21/08* (2006.01)

(58) Field of Classification Search
CPC ........ H01Q 19/13; H01Q 21/28; H01Q 21/24; H01Q 1/36; H01Q 5/20; H01Q 15/14
See application file for complete search history.

(56) References Cited

U.S. PATENT DOCUMENTS

| | | | | |
|---|---|---|---|---|
| 7,724,201 | B2 * | 5/2010 | Nysen | H01Q 1/2275 343/820 |
| 9,711,863 | B2 | 7/2017 | De Luis et al. | |
| 9,715,010 | B2 * | 7/2017 | Pu | H01Q 9/0407 |
| 9,786,990 | B2 | 10/2017 | Platt | |
| 10,320,085 | B1 * | 6/2019 | Lier | H01Q 19/10 |
| 2003/0103015 | A1 * | 6/2003 | Oh | H01Q 9/065 343/742 |
| 2007/0247388 | A1 * | 10/2007 | Asakura | H01Q 9/27 343/834 |
| 2013/0088400 | A1 * | 4/2013 | Chen | H01Q 1/521 343/770 |
| 2013/0178169 | A1 * | 7/2013 | Kuo | H01Q 9/285 455/73 |
| 2017/0294720 | A1 | 10/2017 | Murakowski et al. | |
| 2018/0316097 | A1 | 11/2018 | Wium et al. | |
| 2018/0342790 | A1 | 11/2018 | Oh et al. | |
| 2019/0123721 | A1 * | 4/2019 | Takamine | H03H 9/64 |
| 2019/0286963 | A1 * | 9/2019 | Salehi | G06K 19/07749 |
| 2021/0143552 | A1 * | 5/2021 | Shao | H01Q 1/2291 |
| 2021/0218121 | A1 * | 7/2021 | Noguchi | H01P 5/19 |

FOREIGN PATENT DOCUMENTS

| | | | | | |
|---|---|---|---|---|---|
| CN | 102800965 | A | * | 11/2012 | |
| CN | 102800965 | A | | 11/2012 | |
| CN | 103078179 | A | * | 5/2013 | |
| CN | 104538738 | A | | 4/2015 | |
| CN | 104577322 | A | * | 4/2015 | |
| CN | 204348909 | U | * | 5/2015 | |
| CN | 204538206 | U | * | 8/2015 | |
| CN | 204538206 | U | | 8/2015 | |
| CN | 104901000 | A | | 9/2015 | |
| CN | 104901004 | A | | 9/2015 | |
| CN | 104901004 | B | * | 7/2017 | |
| CN | 206332170 | U | | 7/2017 | |
| CN | 107086377 | A | | 8/2017 | |
| CN | 108073770 | A | | 5/2018 | |
| CN | 208637590 | U | | 3/2019 | |
| CN | 208637590 | U | * | 3/2019 | |
| CN | 108847534 | B | * | 1/2021 | H01Q 1/36 |
| EP | 2565984 | A1 | | 3/2013 | |
| GB | 1001658 | A | | 8/1965 | |
| JP | 5854888 | B2 | * | 2/2016 | H01Q 1/528 |
| JP | 2019146092 | A | | 8/2019 | |
| WO | 2009030039 | A1 | | 3/2009 | |
| WO | 2010041804 | A2 | | 4/2010 | |

OTHER PUBLICATIONS

Victor P. Plessky et al, SAW Tags for the 6-GHz Range, IEEE Transactions on Ultrasonics, Ferroelectrics, and Frequency Control, vol. 61, No. 12, Dec. 2014, 4 pages.
Xie Jiyang et al, Resonance based reflector based UHF /S bow-tie antenna with two opposite uni-directional radiation bands, Chinese Journal of Radio Science, vol. 32, No. 6, Dec. 2017, with an English Abstract, 9 pages.

* cited by examiner 2.45G 6.5G-1

6.5G-2

ANTENNA, ANTENNA MODULE, AND WIRELESS NETWORK DEVICE

CROSS-REFERENCE TO RELATED APPLICATIONS

This application is a continuation of International Application No. PCT/CN2020/116601, filed on Sep. 21, 2020, which claims priority to Chinese Patent Application No. 202010055034.6, filed on Jan. 17, 2020. The disclosures of the aforementioned applications are hereby incorporated by reference in their entireties.

TECHNICAL FIELD

This application relates to the communications field, and in particular, to an antenna, an antenna module, and a wireless network device.

BACKGROUND

A wireless communications product specification of a home network rapidly develops from 2*2, to 4*4, and then to 8*8. A frequency band also develops from 2G, to 5G, and then to 6G. A millimeter wave band also continuously expands. A volume of a wireless device in the home network cannot infinitely increase due to limitation of a product appearance design, a user habit, and a scenario. Therefore, how to implement a high-specification design under an existing product space condition and integrate more high-performance antennas with small impact therebetween in the device becomes a very urgent design requirement, especially a new requirement for a forthcoming 6G frequency band. An N*N MIMO design means that a quantity of antennas and a quantity of radio frequency channels are both increased by N. How to dispose new N independent frequency bands to an existing module to ensure better 6G coverage and not deteriorate existing 2G/5G Wi-Fi performance at the same time becomes a challenge for the product to be technically competitive in Wi-Fi 6 technologies. How to use a new technology or new architecture to reduce an antenna size in an existing environment, enlarge an operating frequency band of an antenna, or increase a quantity of operating frequency bands of an antenna to implement specification upgrade and ensure a high-performance Wi-Fi coverage capability at different frequencies is urgently to be considered by an engineer of the antenna.

SUMMARY

To avoid reduction in radiation performance of a multi-band antenna in an integration process in the conventional technologies, this application provides an antenna, to implement horizontal omnidirectional radiation and vertical directional radiation of the antenna on a plurality of frequency bands.

According to a first aspect, this application provides an antenna, including a first antenna and a second antenna. The first antenna includes a first radiating element and a reflector. The reflector is located between the second antenna and the first radiating element. The reflector includes a connection part and a tooth part. The tooth part includes a plurality of comb teeth that are disposed side by side and that extend from the connection part toward the first radiating element. A gap is disposed between the comb teeth. The tooth part includes a profile facing the first radiating element. Each comb tooth includes an end part facing the first radiating element. The profile is formed through connecting all the end parts. The profile includes a concave part. The concave part is concave to the connection part. The antenna provided in this application includes the first antenna and the second antenna. The two antennas may operate on different frequency bands. The first antenna includes the reflector. The profile concave part formed by the plurality of comb teeth is designed on the reflector. Reflection on a reflection path of the first radiating element for the tooth part is greatly enhanced by using the concave part formed by the comb teeth, to enhance directional radiation of the reflector to the first radiating element in the first antenna.

In this application, a directional radiation effect is implemented for the first radiating element by using the tooth part. Because the gap is disposed between the comb teeth, a reflective surface of the tooth part is discontinuous. Discontinuity of the tooth part structure causes an increase of reflection paths of the reflector to an incident wave. For example, a part of the reflective surface is located on an end surface of the tooth part away from the connection part. A part of the reflective surface is located in the gap. The profile design of the concave part also provides different reflective surfaces. Some of the reflective surfaces are located at a bottom of the concave part, and some of the reflective surfaces are close to a top of the concave part. In this way, the reflection path of the reflector to the first radiating element is no longer a single reflection path. A quantity of reflection paths increases, and specific positions also change. A radiation effect of the first radiating element is significantly improved after the plurality of reflection paths are superimposed. In addition, a phase change occurs on an incident wave of the first radiating element due to the comb tooth structure of the reflector. For example, in an embodiment, a phase change of $\pi/12$ may occur. In addition, when the first radiating element is horizontally polarized, the design of the comb teeth can be used to improve an amplitude of the incident wave of the first radiating element. For example, in an embodiment, the amplitude of the incident wave of the first radiating element can be increased by 1.5 dB, to implement a better co-directional superposition effect in a vertical direction, thereby improving a directional gain.

In this application, the tooth part is designed to implement 180-degree phase hopping of the reflector different from the all-metal structure. Wideband high-gain directional performance can be implemented between the reflector and the first radiating element at a smaller distance. An isolation effect can be implemented between the first radiating element and the second antenna. In other words, a radiated signal from the first radiating element to the second antenna is isolated to avoid an impact on performance of the second antenna.

In an embodiment, at least two of the plurality of comb teeth have different extension lengths. In this embodiment, the comb teeth with different extension lengths are used to form the concave part of the profile of the tooth part. Because of different extension lengths of the comb teeth, the reflection paths of the reflector to the incident wave of the first radiating element are different. In other words, different reflection paths are increased in this embodiment, to facilitate improvement of performance of the first radiating element after the reflection paths are superposed, thereby obtaining a high gain.

In a possible embodiment, the plurality of comb teeth include at least one first comb tooth with a first extension length and at least two second comb teeth with a second extension length. The at least two second comb teeth are symmetrically distributed on two sides of the at least one first comb tooth. The first extension length is less than the second extension length. The second comb teeth whose extension lengths are greater than the extension length of the first comb tooth are symmetrically disposed on the two sides of the first comb tooth. A change of the extension lengths causes a change of tooth crown positions of different comb teeth, to obtain the concave part of the profile of the tooth part formed by the first comb tooth and the second comb teeth. A distance between the first comb tooth and the first radiating element is different from a distance between the second comb tooth and the first radiating element. For the first radiating element, when the incident wave of the first radiating element is radiated to the first comb tooth and the second comb tooth, there are different reflection paths. In other words, in this embodiment, different reflection paths are increased. An increase of the reflection paths facilitates enhancement of directional radiation performance of the first radiating element. In this embodiment, the second comb teeth are symmetrically disposed on the two sides of the first comb tooth, so that the concave part has a symmetrical structure. Reflection of the symmetrically distributed comb teeth to the first radiating element facilitates obtaining of a stable phase and a polarization direction of the first radiating element.

In a possible embodiment, the plurality of comb teeth further include at least two third comb teeth with a third extension length. The at least two third comb teeth are symmetrically distributed on the two sides of the at least one first comb tooth. The second comb tooth is located between the third comb tooth and the first comb tooth. The third extension length is greater than the second extension length. The third comb teeth whose extension lengths are greater than the extension length of the second comb tooth are symmetrically distributed on two sides of the second comb teeth, to form the concave part of the step-like profile. Therefore, a distance between the third comb tooth and the first radiating element is different from the distance between the second comb tooth and the first radiating element, to increase reflection paths of the incident wave of the first radiating element, thereby enhancing directional radiation of the reflector to the first radiating element in the first antenna. In this embodiment, comb teeth with three steps of different extension lengths are provided, to obtain better performance of the first radiating element and obtain a high gain.

Specifically, the extension length of the first comb tooth is the smallest. The extension length of the first comb tooth may be zero. In other words, no comb tooth is disposed in a region in the middle of the connection part, and a reflection function is implemented by using the connection part.

In a possible embodiment, the tooth part is a symmetrical structure centered on a central axis. An extension direction of the central axis is the same as an extension direction of the comb tooth. Tooth roots of all the comb teeth are aligned in a direction perpendicular to the direction of the central axis. The symmetrically distributed tooth part can form the symmetrical concave part, that is, form the symmetrical reflector. Only the symmetrical reflector can implement an optimal effect of the directional radiation of the first radiating element. In this embodiment, architecture with the aligned tooth roots is disposed, so that a manufacturing process of the reflector becomes simpler. Specifically, the connection part is in a shape of a strip perpendicular to the central axis of the tooth part. The connection part is connected to the tooth roots of the comb teeth. All the comb teeth are connected to form an entire structure.

In a possible embodiment, extension lengths of the plurality of comb teeth are the same. When the extension lengths of the plurality of comb teeth are the same, a shape of the connection part may be adjusted, to form the concave part of the profile of the tooth part. In this embodiment, the connection part is disposed. A shape of the profile of a surface used to connect the comb teeth is the same as a profile on a side of the tooth part facing the first radiating element. The plurality of comb teeth are designed as the same shape and the same size. It is easy to process the comb teeth with the same specification. Specifically, when the reflector is a three-dimensional structure, the connection part and the comb teeth may be manufactured separately. In this case, it is easy to uniformly manufacture the plurality of comb teeth with the same size. Then, the comb teeth are fastened to the surface of the connection part. The comb teeth may be fastened through welding, bonding, or magnetic attachment. Certainly, the reflector may alternatively be a microstrip structure printed on a circuit board.

In a possible embodiment, the concave part includes a step-like part. One layer of a step shape may be obtained for the step-like concave part by using only the plurality of comb teeth with the same extension length. Different extension lengths are selected according to manufacturing requirements. In this way, a manufacturing process is simple. Specifically, each comb tooth is approximately a cuboid or a rectangle. Each comb tooth includes an end surface (or an end edge) and side surfaces (or side edges) connected between the end surface (or the end edge) and a tooth root. In this embodiment, the end surface (the end edge) is a plane (a straight line), and the side surfaces (the side surfaces) are perpendicular to the end surface (the end edge). In this way, a step-like arrangement is formed among the tooth crowns of the comb teeth, to form the concave part of the profile on the side of the tooth part facing the first radiating element.

In a possible embodiment, the concave part includes a smoothly transited arc part. The reflector with the concave part can have a better reflection effect by using the smoothly transited arc part, to greatly improve a directional radiation effect of the reflector to the first radiating element.

Specifically, each comb tooth includes the end surface (or the end edge) facing the first radiating element and the side surfaces (or the side edges) connected between the end surface (or the end edge) and the tooth root. The two side surfaces (the side edges) have different sizes. The end surface (the end edge) extends in an inclined direction relative to the extension direction of the comb tooth. In other words, an included angle between the end surface (or the end edge) and one of the side surfaces (or the side edges) is an acute angle. The end surface (the end edge) may be an inclined straight line or an arc. A plurality of inclined straight lines or arcs jointly form the smoothly transited arc.

In a possible embodiment, the concave part includes a straight line with an acute angle as an inclined angle to an extension direction, or the concave part includes a combination of a straight line with an acute angle as an inclined angle to an extension direction and a straight line perpendicular to the extension direction, or the concave part includes a combination of a straight line with an acute angle as an inclined angle to an extension direction and a smoothly transited arc. Different combination manners can be selected to meet different process requirements and performance requirements. A better directional radiation effect is implemented by using the smooth arc. A process of manufacturing a straight line with an acute angle to the extension direction is simpler. In an embodiment of a manufacturing process, one or two combinations may be selected according to a requirement, to find a balance between a reflection effect and the manufacturing costs.

In a possible embodiment, each comb tooth includes two sidewalls connected between the tooth root and the tooth crown. The two sidewalls are parallel. In other words, a gap between the two comb teeth keeps the same from bottom to top, to ensure even current distribution on the comb teeth and ensure a radiation enhancement effect of the reflector to the first radiating element. The two sidewalls of the comb tooth are parallel, so that a width of the comb tooth keeps consistent from the tooth root to the tooth crown. In addition, a gap between two adjacent comb teeth also keeps consistent. More even distribution can be implemented for induced currents of the comb teeth with consistent width sizes, which facilitates the directional radiation effect of the entire reflector to the first radiating element.

In a possible embodiment, the first radiating element is horizontally polarized. The reflector and the first radiating element work together to implement directional radiation performance of the first antenna. The second antenna is vertically polarized. The first antenna and the second antenna are orthogonally polarized. The first radiating element is horizontally polarized. The second antenna is vertically polarized. Directional radiation of the first radiating element is enhanced due to an operation of the reflector. The vertically polarized second antenna has omnidirectional radiation performance.

In a possible embodiment, the extension length of each comb tooth does not exceed a quarter of a wavelength corresponding to a low-frequency resonance center frequency of the first radiating element. An edge comb tooth resonates when the first radiating element operates, which reduces a reflection effect of the reflector to the first radiating element. Therefore, the extension length of the comb tooth is less than a quarter of the wavelength corresponding to the low-frequency resonance center frequency of the first radiating element.

In a possible embodiment, the width of each comb tooth does not exceed a tenth of a wavelength corresponding to a resonance center frequency of the first radiating element. For the step structure design of the comb teeth, the width of each comb tooth does not exceed a tenth of the wavelength of the resonance center frequency of the first radiating element, in consideration of a minimum two-step change and a width size of the entire reflector. Specifically, in consideration of an entire size of the antenna, a length of the first radiating element is a half of a wavelength, and a width of the corresponding reflector is consistent with the length of the first radiating element. In an example of a high frequency 6.5G, the width of the corresponding reflector is a half of the wavelength: 23 mm. In this case, the step comb tooth structure requires widths of at least three comb teeth and at least two tooth gaps. A total of five width values are considered, that is, a maximum of the width of each comb tooth is a tenth of the wavelength: 4.6 mm.

In a possible embodiment, the tooth gap between adjacent comb teeth does not exceed a tenth of the wavelength corresponding to the low-frequency resonance center frequency of the first radiating element. For the step structure design of the comb teeth, the width of each comb tooth does not exceed a tenth of the wavelength of the resonance center frequency of the first radiating element, in consideration of a minimum two-step change and a width size of the entire reflector. Specifically, in an example of a high frequency 6.5G, the width of the reflector is a half of the wavelength: 23 mm. In this case, the step comb tooth structure requires widths of at least three comb teeth and at least two tooth gaps. A total of five width values are considered, that is, a maximum of the width of each tooth gap is a tenth of the wavelength: 4.6 mm.

In a possible embodiment, the first radiating element is a symmetrical structure centered on a first axis. The first radiating element includes two first radiation arms symmetrically distributed on two sides of the first axis. The two symmetrically distributed first radiation arms form a dipole unit. In this case, the first radiating element may be considered as a dipole antenna. For the reflector, the concave part of the profile of the reflector may be adjusted based on the first radiating element with a symmetrical structure when being designed, so that the central axis of the tooth part overlaps the first axis. In this way, reduction of the directional radiation performance due to phase deviation does not occur for the reflection effect of the reflector to the first radiating element.

Specifically, the two radiation arms of the first radiating element may be in a shape of a strip or a rectangle, and extension directions of the two radiation arms are both perpendicular to the first axis. The two radiation arms of the first radiating element may be collinear. In another embodiment, each radiation arm of the first radiating element includes a first part and a second part. The first part is in a shape of a square and is close to the first axis. The second part is connected to a side of the first part away from the first axis. The second part is L-shaped.

In a possible embodiment, the first antenna further includes a balanced balun structure. The balanced balun structure is located between the first radiating element and the reflector, and is connected to the two first radiation arms. The balanced balun structure is designed to enable the same current amplitude of the first antenna, and also implement impedance transformation. For the first antenna, better symmetry of the first antenna indicates a more stable phase difference. The two first radiation arms are connected by using a 180-degree phase extension line of the balanced balun structure, to better maintain balance of the first antenna.

Specifically, the balanced balun structure includes a first connection end, a second connection end, and an extension line connected between the first connection end and the second connection end. The first connection end is connected to one radiation arm of the first radiating element. The second connection end is connected to the other radiation arm of the first radiating element. The first connection end and the second connection end are symmetrically distributed on two sides of the first axis. An extension track of the extension line may be in a shape of a rectangle, a circle, a winding, or the like. This is not limited in this application. The extension line is also symmetrically distributed by using the first axis as a center. In an embodiment, the extension line forms elongated rectangular architecture. An extension direction of the rectangular architecture is perpendicular to the first axis.

In a possible embodiment, the connection part is connected to the second antenna. The connection part is connected to the second antenna. In this case, the reflector is connected to the second antenna. When the second antenna is excited, a corresponding current is also distributed to the reflector. In this case, the reflector (especially the part of the comb teeth) participates in a radiation function of the second antenna. In other words, the reflector also participates in radiation of the second antenna. In this embodiment, a miniaturized design of the antenna is implemented, and radiation performance of the first antenna and the second antenna is also enhanced in limited space.

In a possible embodiment, the second antenna includes a high-frequency radiating element and a low-frequency radiating element. The high-frequency radiating element and the low-frequency radiating element are orthogonally polarized to the first radiating element of the first antenna. The connection part is connected to the low-frequency radiating element. In this embodiment, the comb teeth of the reflector are integrated at an end of the low-frequency radiating element of the second antenna. The reflector and the low-frequency radiating element jointly form a standard low-frequency radiator with a quarter of the wavelength. Specifically, the second antenna has a high-frequency feature and a low-frequency feature. The high-frequency radiating element and the low-frequency radiating element are orthogonally polarized to the first radiating element, to implement orthogonal polarization between the first antenna and the second antenna and reduce mutual impact between the first antenna and the second antenna on different operating frequency bands. Generally, a size of the low-frequency radiating element is greater than a size of the high-frequency radiating element. In consideration of a compact structure, the low-frequency radiating element is connected to the connection part of the reflector. In this way, the comb teeth of the reflector also participate in radiation of the low-frequency radiating element, and may further be used as a reflector of the first radiating element. The same structure has different functions, to better present a feature of a small size and a plurality of functions of the antenna provided in this application.

In a possible embodiment, the high-frequency radiating element includes a high-frequency upper radiator and a high-frequency lower radiator, and the low-frequency radiating element includes a low-frequency upper radiator and a low-frequency lower radiator. The high-frequency upper radiator is connected to the low-frequency upper radiator. The high-frequency upper radiator is distributed on two sides of the low-frequency upper radiator. The high-frequency lower radiator is connected to the low-frequency lower radiator. The high-frequency lower radiator is distributed on two sides of the low-frequency lower radiator. The connection part of the reflector is connected to the low-frequency upper radiator. The high-frequency lower radiator and the low-frequency lower radiator form a lower branch. The high-frequency upper radiator and the low-frequency upper radiator form an upper branch. The upper branch is located between the reflector and the lower branch.

Specifically, the high-frequency upper radiator, the high-frequency lower radiator, the low-frequency upper radiator, and the low-frequency lower radiator are designed as dipole-like antenna units. In this way, advantages of this design are a simple structure and a proper size. An antenna on a corresponding operating frequency band may be obtained through adjusting only sizes of radiation arms of different radiators. Herein, a purpose of distributing the high-frequency radiating element on two sides of the low-frequency radiating element is to minimize impact between the low-frequency radiating element and the low-frequency radiating element. Because the radiation arm of the low-frequency radiating element has a large size, the low-frequency radiating element is connected to the connection part of the reflector in consideration of a miniaturization design. If the low-frequency radiating element is distributed on two sides of the high-frequency radiating element, the low-frequency radiating element and the reflector form a closed loop, which greatly affects the high-frequency radiating element that is encircled. In addition, the low-frequency radiating element is connected to the connection part of the reflector to implement an integrated tri-band dual-polarized double-fed design of a symmetrical dual-frequency dipole and a high-gain directional antenna.

In a possible embodiment, the second antenna is a symmetrical structure centered on a second axis. The low-frequency upper radiator includes two radiation arms that are symmetrically distributed on two sides of the second axis and whose extension directions are parallel to the second axis. The high-frequency upper radiator includes two radiation arms that are symmetrically distributed on the two sides of the second axis and whose extension directions are parallel to the second axis. Ends of the radiation arms of the high-frequency upper radiator facing the lower branch are connected, by using a first connection arm, to ends of the radiation arms of the low-frequency upper radiator facing the lower branch. The first connection arm is perpendicular to the second axis. A design of the two radiation arms can be used to implement a design in which the radiator in the second antenna is symmetrical to the second axis, and also reduce mutual impact between the high-frequency radiating element and the low-frequency radiating element in the second antenna. For the high-frequency radiator, if the high-frequency radiator has only one radiation arm, the radiation arm cannot be symmetrically distributed on the two sides of the low-frequency radiator. This inevitably leads to performance degradation of the second antenna.

In a possible embodiment, the low-frequency lower radiator includes two radiation arms that are symmetrically distributed on two sides of the second axis and whose extension directions are parallel to the second axis. The high-frequency lower radiator includes two radiation arms that are symmetrically distributed on two sides of the second axis and whose extension directions are parallel to the second axis. Ends of the radiation arms of the high-frequency lower radiator facing the upper branch are connected, by using a second connection arm, to ends of the radiation arms of the low-frequency lower radiator facing the upper branch. The second connection arm is parallel to the first connection arm. For the low-frequency lower radiator and the high-frequency lower radiator, a problem of symmetrical distribution also may be considered during a design of the low-frequency lower radiator and the high-frequency lower radiator. In a design of two radiation arms, the manufacturing costs can be reduced, and a required polarization effect can also be implemented.

In a possible embodiment, ends of the radiation arms of the low-frequency lower radiator away from the upper branch are connected to connection sections. The connection sections are symmetrically distributed on two sides of the second axis and are collinear. A design of the connection section is a miniaturization design without affecting a horizontal polarization effect of the second antenna. A resonance frequency of the low-frequency lower radiator can be adjusted through adding the connection section to the original radiation arm, to avoid excessively large sizes of the radiation arms of the low-frequency lower radiator for enhancing the resonance frequency.

In a possible embodiment, the second antenna is a symmetrical structure centered on a second axis. The low-frequency upper radiator and the low-frequency lower radiator are both rectangular structures with the second axis as a symmetrical center. A long-edge direction is parallel to the second axis. The high-frequency upper radiator includes two radiation arms that are symmetrically distributed on two sides of the second axis and whose extension directions are parallel to the second axis. Ends of the radiation arms of the high-frequency upper radiator facing the lower branch are connected, by using a first connection arm, to ends of the radiation arms of the low-frequency upper radiator facing the lower branch. The first connection arm is perpendicular to the second axis and is collinear. In this design, high-frequency and low-frequency radiators are cascaded only at the first connection arm, to obtain the high-frequency radiating element and the low-frequency radiating element that can be separated from each other, so that the high-frequency radiating element and the low-frequency radiating element have more distinct radiation effects.

In a possible embodiment, the high-frequency lower radiator includes two radiation arms that are symmetrically distributed on two sides of the second axis and whose extension directions are parallel to the second axis. Ends of the radiation arms of the low-frequency lower radiator facing the upper branch are connected, by using a second connection arm, to ends of the radiation arms of the low-frequency lower radiator facing the upper branch. The second connection arm is perpendicular to the second axis and is collinear. In this design, high-frequency and low-frequency radiators are cascaded only at the second connection arm, to obtain the high-frequency radiating element and the low-frequency radiating element that can be separated from each other, so that the high-frequency radiating element and the low-frequency radiating element have more distinct radiation effects.

In a possible embodiment, the second antenna is a symmetrical structure centered on a second axis. The low-frequency upper radiator includes two radiation arms that are symmetrically distributed on two sides of the second axis and whose extension directions are parallel to the second axis. The high-frequency upper radiator includes two radiation arms that are symmetrically distributed on the two sides of the second axis and whose extension directions are parallel to the second axis. The radiation arms of the high-frequency upper radiator are integrally connected to the radiation arms of the low-frequency upper radiator. Ends of the radiation arms of the low-frequency upper radiator facing the lower branch are connected by using a first connection arm. The first connection arm is perpendicular to the second axis. The radiation arms of the high-frequency radiating element are correspondingly connected to the radiation arms of the low-frequency radiating element, to form a discontinuous step structure. A step hopping position is selected based on lengths required for different frequencies.

In a possible embodiment, the low-frequency lower radiator includes two radiation arms that are symmetrically distributed on two sides of the second axis and whose extension directions are parallel to the second axis. The high-frequency lower radiator includes two radiation arms that are symmetrically distributed on two sides of the second axis and whose extension directions are parallel to the second axis. The radiation arms of the high-frequency lower radiator are integrally connected to the radiation arms of the low-frequency lower radiator. Ends of the radiation arms of the low-frequency lower radiator facing the upper branch are connected by using a second connection arm. The second connection arm is parallel to the first connection arm.

In a possible embodiment, a value of a distance between the connection part and the first radiating element is less than a quarter of a sum of a resonance wavelength of the first radiating element and a low-frequency resonance wavelength of the low-frequency radiating element. In the directional radiation design of the first antenna, a distance between the first radiating element and the reflector is a quarter of a wavelength corresponding to a center frequency. In this case, a phase change in a round-trip distance is 180 degrees, so that a reflected signal and a radiated signal implement a 360-degree change due to a phase inversion function of the reflector. The radiated signal is superimposed on the reflected signal with the same phase. Therefore, a value of the distance between the connection part of the reflector and the first radiating element is less than a quarter of the sum of the resonance wavelength of the first radiating element and the low-frequency resonance wavelength of the low-frequency radiating element.

According to a second aspect, this application provides an antenna module, including a first feeder, a second feeder, and any one of the foregoing antennas. The first feeder is connected to a first antenna, and the second feeder is connected to a second antenna. The first antenna is excited by using the first feeder to horizontally polarize the first antenna, and the second antenna is excited by using the second feeder to vertically polarize the second antenna, thereby forming a tri-band dual-polarized antenna.

In a possible embodiment, the antenna is located on a first plane. The first feeder is perpendicular to the first plane. The second feeder is parallel to the first plane. Currents pass through the first feeder and the second feeder. Therefore, electromagnetic fields exist around the feeders. Due to selection of an orthogonal design, the induction fields around the first feeder and the second feeder are also orthogonal. Mutual impact between the induction fields is the smallest, and transmission efficiency is the highest.

Specifically, the first feeder includes a first external conductor, a first internal conductor, and a first dielectric insulation part. The first external conductor passes through a substrate and is electrically connected to a first feed point of the first antenna. The first feed point is connected to one end of the first internal conductor by using the first dielectric insulation part. The other end of the first internal conductor is electrically connected to a second feed point of the first antenna.

The first internal conductor is an arc bent conductor.

The second feeder includes a second external conductor, a second internal conductor, and a second dielectric insulation part. The second external conductor and the second internal conductor are attached to and disposed on the first plane. The second external conductor is connected to a third feed point of the second antenna. The second dielectric insulation part protrudes from the third feed point. The second dielectric insulation part is connected to one end of the second internal conductor. The other end of the second internal conductor is connected to a fourth feed point of the second antenna.

According to a third aspect, this application provides a wireless network device, including a feeding network and any one of the foregoing antenna modules. The feeding network is connected to a first feeder and a second feeder of the antenna module, to excite the first antenna and the second antenna. The antenna module is fed by using the feeding network. The first antenna and the second antenna are orthogonally polarized. Due to a design of a reflector in a shape of comb teeth in the first antenna, reflection paths of an incident wave of the first antenna are increased, to enhance a directional radiation effect of the first antenna.

DESCRIPTION OF EMBODIMENTS

The following clearly describes embodiments of this application in detail with reference to the accompanying drawings.

Figure 1:
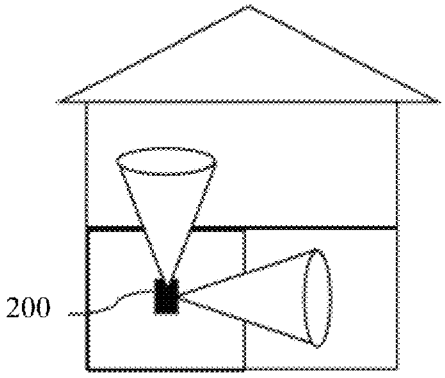
FIG. 1 is a diagram of an application scenario of a wireless network device according to an embodiment of this application.

With development of communications technologies, wireless communication in a home scenario also has higher transmission requirements. As shown in FIG. 1, this application provides a wireless network device 200. An antenna (not shown in the figure) disposed in the wireless network device 200 is horizontally omnidirectional and vertically directional, to meet wireless communication requirements in different home scenarios. Generally, most common house types are single-layer house types. Coverage requirements of this house type for home wireless communication are concentrated in being horizontally omnidirectional. In other words, different rooms in the same-floor house type can be covered by the wireless network device 200. For some duplex or villa houses, a vertical coverage function of a wireless network may be further met, to implement wireless communication at different floors. In this case, the wireless network device 200 may have good energy concentration and a vertically directional feature.

Figure 2:
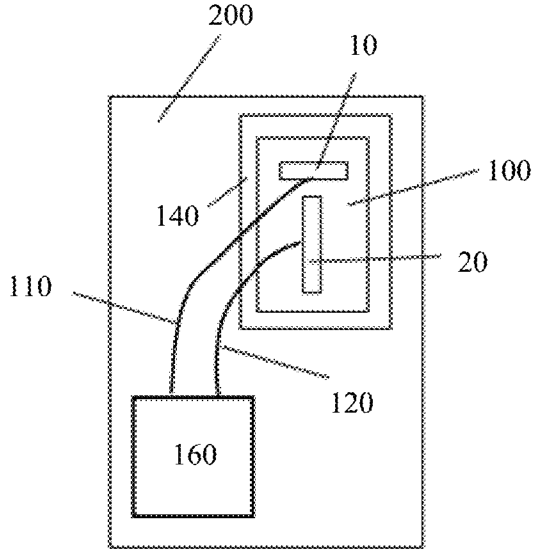
FIG. 2 is a schematic diagram of a structure of an antenna module according to an embodiment of this application.

In an embodiment, as shown in FIG. 2, the wireless network device 200 includes an antenna 100 disposed on a substrate 140, a first feeder 110 configured to excite the antenna 100, a second feeder 120, and a feeding network 160. In this embodiment, the antenna 100 includes a first antenna 10 and a second antenna 20. When a signal of the feeding network 160 is input, the first antenna 10 and the second antenna 20 are excited to obtain resonance modes of the first antenna 10 and the second antenna 20 at different frequencies, to implement vertically directional radiation of the first antenna 10 and horizontally omnidirectional radiation of the second antenna 20. In this way, a horizontally omnidirectional function and a vertically directional function of the wireless network device 200 are ensured on different frequency bands.

It should be noted that the antenna 100 in this application may be a printed dipole antenna, that is, manufactured on a surface of a dielectric slab in a manner of printing a microstrip; or may be stereo metal antenna architecture. In comparison with a conventional dipole antenna, the printed dipole antenna is smaller in size and lighter in weight, and easy in integration. In addition, the printed dipole antenna has a relatively large bandwidth and a stable radiation direction, which facilitates a polarization design.

Figure 3:
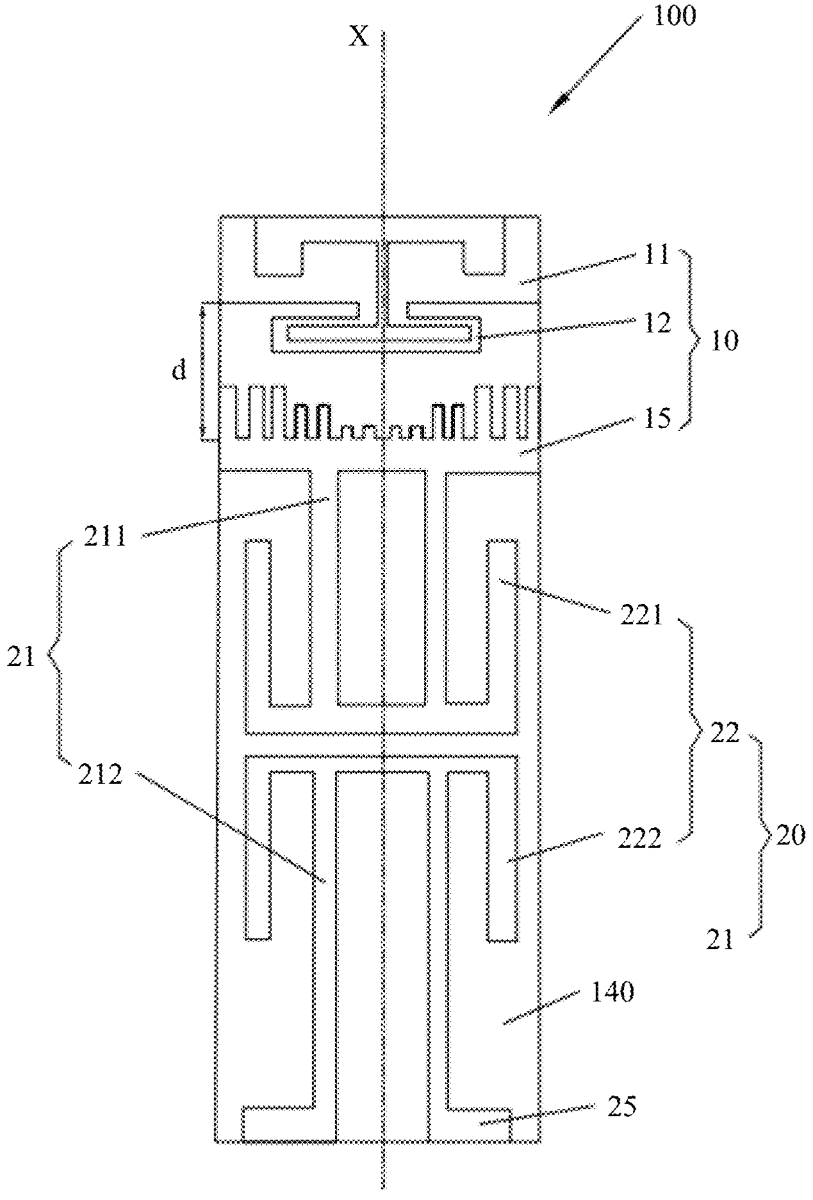
FIG. 3 is a diagram of a structure of an antenna according to an embodiment of this application.
Figure 4:
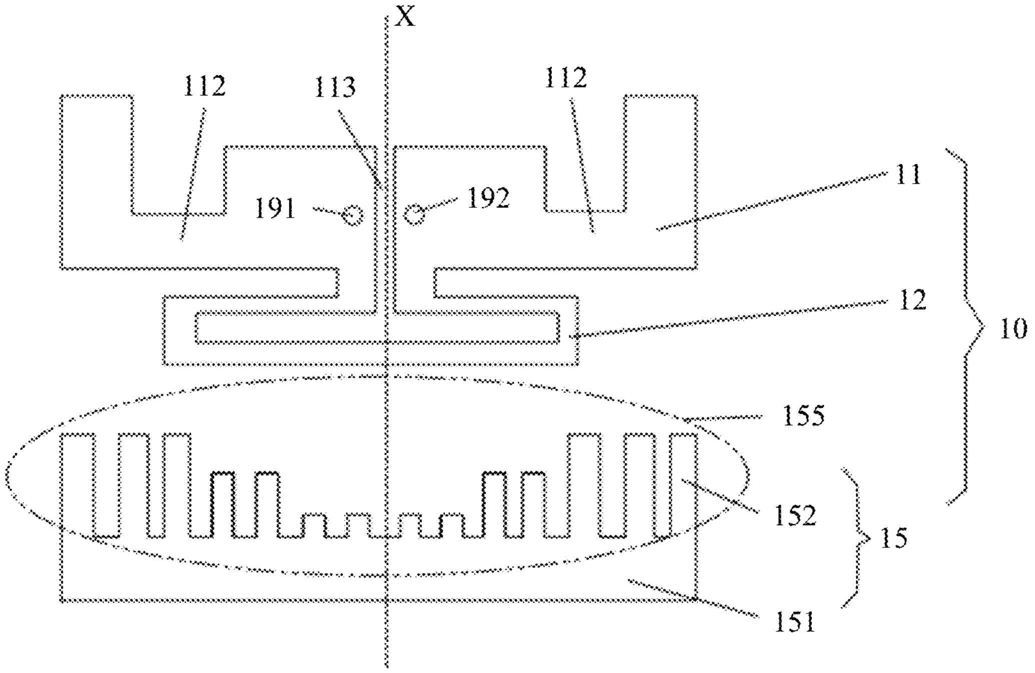
FIG. 4 is a diagram of a structure of a first antenna in an antenna according to an embodiment of this application.
Figure 14:
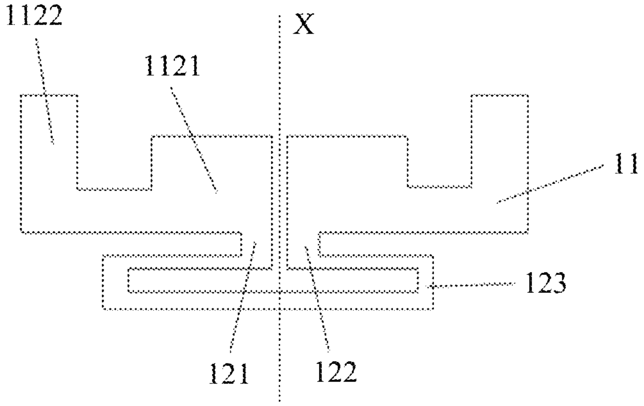
FIG. 14 is a diagram of a structure of a first radiating element in an antenna according to an embodiment of this application.

In a possible embodiment, as shown in FIG. 3 and FIG. 4, the antenna 100 is printed on a working panel surface of the substrate 140. The antenna 100 includes the first antenna 10 and the second antenna 20. Specifically, the first antenna 10 includes a first radiating element 11 and a reflector 15. The first radiating element 11 is a dipole including two first radiation arms 112. The two first radiation arms 112 have the same shape and the same structure. A gap 113 is disposed between the two first radiation arms 112. The two first radiation arms 112 of the first radiating element 11 may be in a shape of a strip or a rectangle, and extension directions of the two radiation arms 112 are both perpendicular to a first axis X. In an embodiment, the two first radiation arms 112 of the first radiating element 11 are collinear, and the two collinear first radiation arms 112 form a dipole pair easy to be polarized. As shown in FIG. 4 and FIG. 14, in another embodiment, the first radiation arm 112 of the first radiating element 11 includes a first part 1121 and a second part 1122. The first part 1121 is in a shape of a square and is close to the first axis X. The second part 1122 is connected to a side of the first part away from the first axis X. The second part is L-shaped. For the first radiating element 11, a central feeding mode is used. In other words, a first feed point 191 and a second feed point 192 that are used to feed the first antenna 10 are located in a central region relative to the two first radiation arms 112. Sizes of the first radiation arms 112 in the first radiating element 11 are adjusted to ensure that an operating frequency of the first radiating element 11 to be a 6G high frequency band. As shown in the figure, in the central feeding mode, the two first radiation arms 112 form a broadside array. In this case, current directions in the first radiation arms 112 are the same. The first radiating element 11 is fed, so that the two first radiation arms 112 generate co-directional currents and radiate electromagnetic fields. A main lobe direction in a lobe diagram of the first radiating element 11 points to a first direction. Specifically, in an application scenario of FIG. 1, the first direction is a propagation direction between floors, that is, a vertical direction, to implement radiation of the antenna 100 in the vertical direction.

Figure 5:
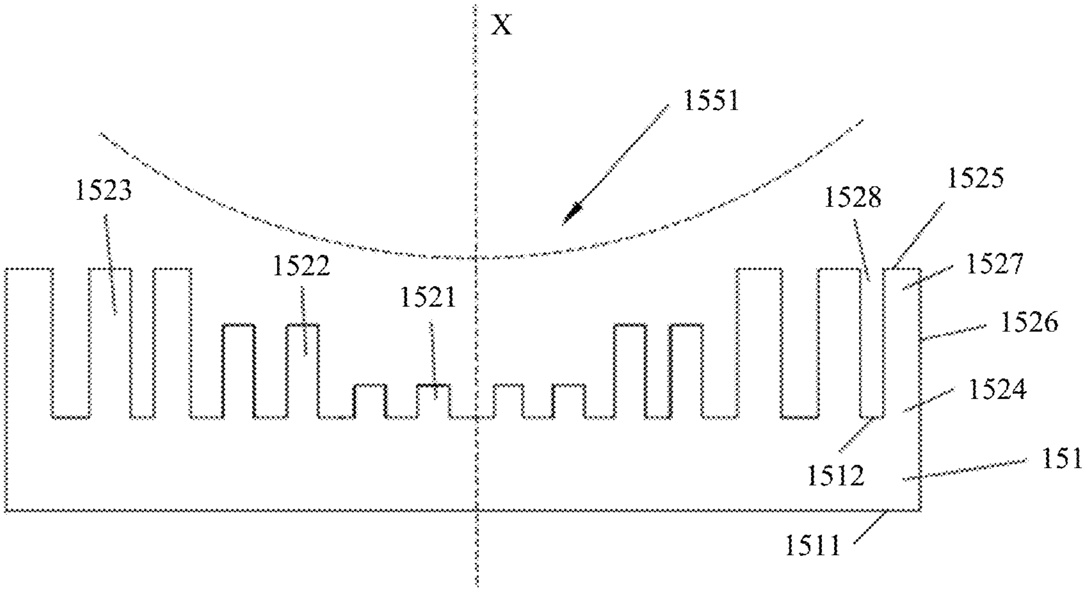
FIG. 5 is a diagram of a structure of a reflector in an antenna according to an embodiment of this application.

As shown in FIG. 3 to FIG. 5, a reflector 15 is disposed between the second antenna 20 and the first radiating element 11. The reflector 15 includes a connection part 151 and a tooth part 155. The tooth part 155 includes a plurality of comb teeth 152 that are disposed side by side and that extend from the connection part 151 toward the first radiating element 11. A tooth gap 1528 is disposed between the comb teeth 152. A profile of the tooth part 155 facing the first radiating element 11 includes a concave part 1551. The concave part 1551 is concave to the connection part 151. Specifically, the profile of the tooth part 155 facing the first radiating element 11 may be understood as a profile face or a profile line jointly formed by end parts (the end parts indicate upper end surfaces 1525 of the comb teeth shown in FIG. 5) of the comb teeth 152 facing the first radiating element 11. As shown in FIG. 5, all the upper end surfaces 1525 of the comb teeth 152 collectively form the profile of the tooth part 155 facing the first radiating element 11.

Different from an all-metal or equal-height reflector design in a conventional design, in this embodiment, the upper end surfaces 1525 of the comb teeth 152 form a reflective surface. Because the tooth gap 1528 exists between the comb teeth 152, the reflective surface formed by the upper end surfaces 1525 of the comb teeth 152 is a discontinuous reflective surface. For a conventional all-metal or equal-height reflector, the reflective surface of the reflector is a complete surface. When the first radiating element 11 is radiated toward the reflector 15, a reflection function of the all-metal reflector to an incident wave is one-time. In this case, a phase of the reflected incident wave is fixed. In this embodiment, the reflective surface formed by the upper end surfaces 1525 of the comb teeth 152 is the discontinuous reflective surface. Reflection paths of the incident wave are increased due to discontinuity of a structure of the reflective surface. For example, some incident waves are reflected by the upper end surfaces 1525 of the comb teeth 152, and some incident waves pass through the tooth gap 1528 between the comb teeth 152 and are reflected by sidewalls (that is, sidewalls 1526 of the comb teeth 152) of the tooth gap 1528. In other words, in a design of the comb teeth 152, an area of the reflective surface is increased, to increase the reflection paths of the incident wave. The increase of the reflection paths leads to superimposing of reflected waves on the plurality of paths, to improve an overall reflection effect of the reflector 15 to the first radiating element 11 and implement the vertical directional radiation function of the reflector 15 in a shape of the comb teeth to the first radiating element 11. In addition, the increase of the reflection paths due to the gap between the comb teeth 152 causes a 180-degree phase change when the incident wave is reflected, and further causes an additional limit change. In other words, the phase change is not equal to 180 degrees, thereby enhancing the vertical directional radiation effect of the first radiating element 11. The reflection paths can be increased for the reflector 15 with the comb teeth 152 may be understood to be similar to a principle in which a digestion area is increased by using intestinal villi. If the small intestine has a smooth surface, the digestion area is fixed. However, for the small intestine with the intestinal villi, the digestion area of the small intestine is greatly increased. This is similar to the reflector 15 with the comb teeth 152. A reflection effect for the incident wave is implemented not only by the upper end surfaces 1525 facing the first radiating element 11, but also by the sidewalls 1526 of the comb teeth 152, thereby increasing possible reflection paths of the incident wave.

In addition, the profile on the side of the tooth part 155 facing the first radiating element 11 is concave to the connection part 151. A design of the concave profile is to form a reflective concave surface. Under a function of the reflective concave surface, the incident wave has better directivity when being reflected. A design principle of the reflective concave surface is similar to that of a concave reflector of a vehicle headlight. A front view is most important during driving of a vehicle at night. To enhance a searchlighting function of the vehicle headlight for the front, the concave reflector is designed behind the headlight. A light converging effect is implemented by using the concave reflector. For this design, to better improve the vertical directional radiation function of the first radiating element 11, the reflector 15 on the concave profile is disposed on the side of the first radiating element 11. In this way, the reflection paths are increased, and a reflection function of the reflector 15 can be further improved, thereby enhancing the directional radiation function of the first radiating element 11. In the foregoing design of the first antenna 10, the reflector 15 with the concave part 1551 formed by using the comb teeth 152 not only increases reflection paths of the incident wave, but also increases phase change values of the incident wave different from 180 degrees. In addition, in the design of the concave part 1551, the reflection function of the reflector 15 is further improved, and the directional radiation function of the first radiating element 11 is enhanced.

In an embodiment, the first radiating element 11 has the two symmetrical first radiation arms 112. To ensure the reflection effect of the concave reflective surface to the first radiating element 11, as shown in FIG. 5, the plurality of comb teeth 152 are symmetrically distributed on two sides of a central axis of the connection part 151. The central axis overlaps the central axis X of the first radiating element 11. For ease of description, the central axis X of the first radiating element 11 is denoted herein as the first axis X.

Figure 6A:
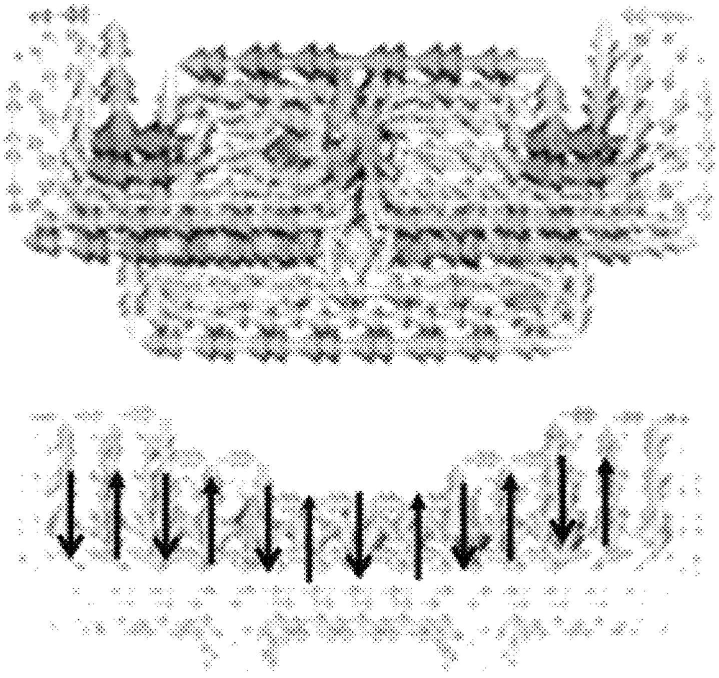
FIG. 6*a* is a distribution diagram of an induced current of a reflector in an antenna according to an embodiment of this application.
Figure 6B:
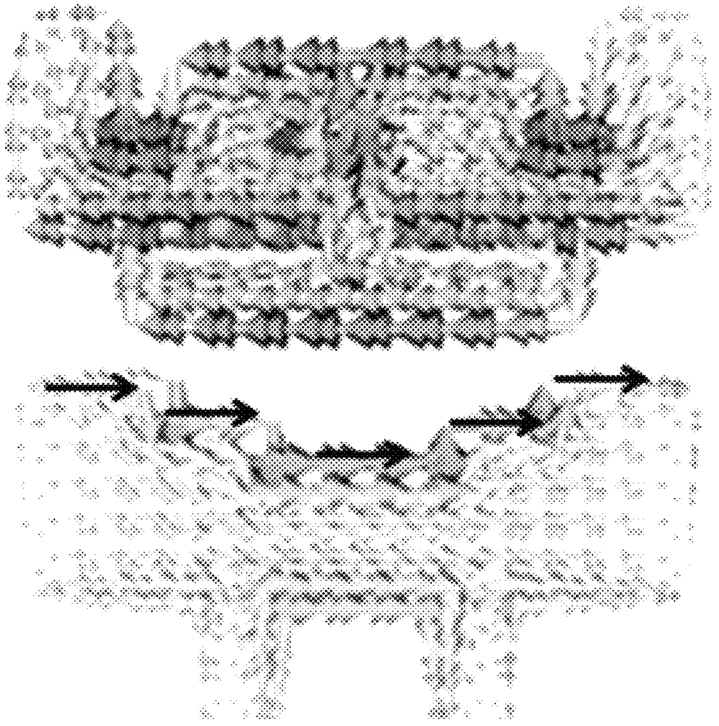
FIG. 6*b* is a distribution diagram of an induced current of an all-metal reflector in the conventional technologies.
Figure 7A:
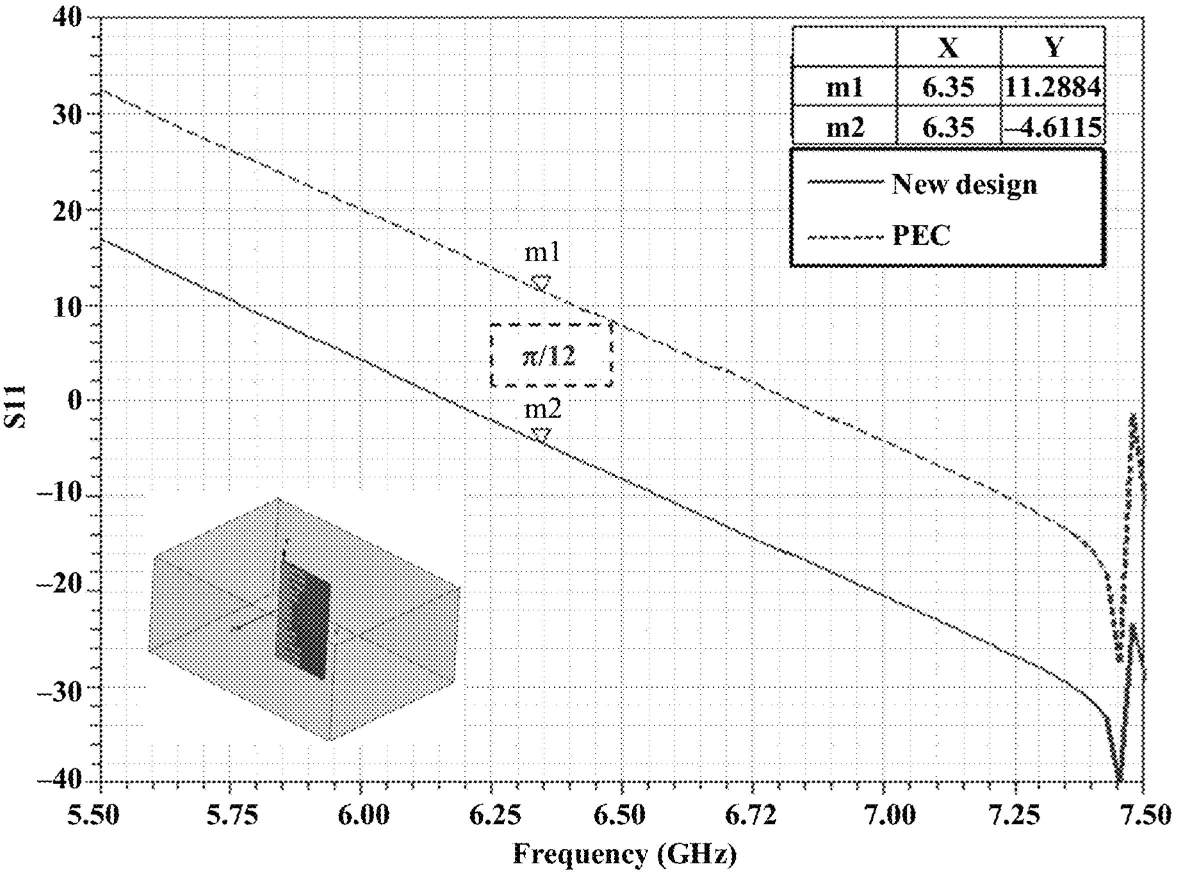
FIG. 7*a* is a diagram of an S-phase parameter of an antenna provided in an embodiment of this application and a first antenna in an antenna in the conventional technologies.
Figure 7B:
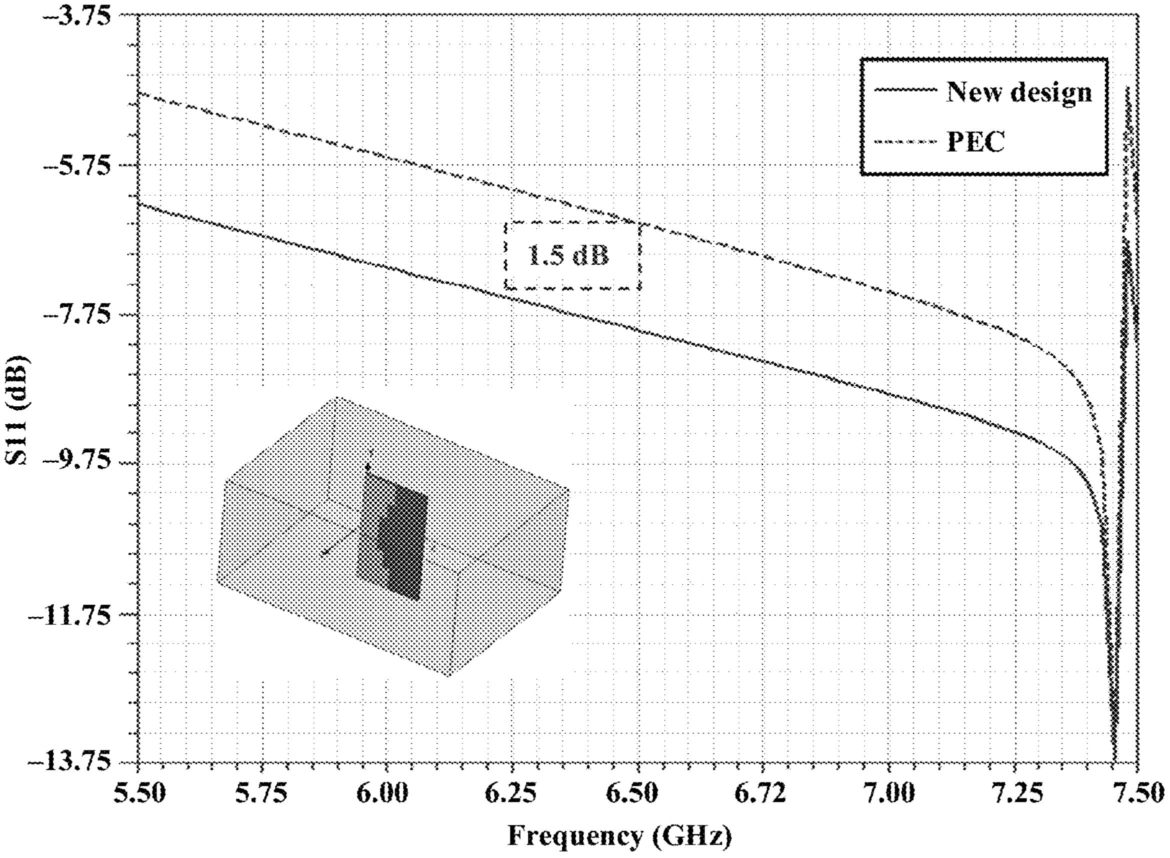
FIG. 7*b* is a diagram of radiant intensity of an antenna provided in an embodiment of this application and a first antenna in an antenna in the conventional technologies.

As shown in FIG. 6*a* and FIG. 6*b*, an impact of the reflector 15 with the structure of the comb teeth 152 on the directional radiation feature of the first radiating element 11 in this embodiment is compared with an impact of a conventional reflector with an all-metal structure on the directional radiation feature of the first radiating element 11. Directions of arrows in FIG. 6*a* and FIG. 6*b* represent directions of induced currents. Distribution intensity of the arrows indicates intensity of the induced current. The induced current of the reflector 15 with the structure of the comb teeth 152 is distributed to each comb tooth 152. In other words, the induced current is distributed to not only the upper end surface 1525 of each comb tooth 152 but also two sidewalls 1526 of each comb tooth 152. For the conventional reflector with the all-metal structure, the induced current is only distributed to an outermost surface of the reflector. It can be learned from the distribution comparison of the induced currents that the reflector 15 with the structure of the comb teeth 152 has a stronger interaction to the first radiating element 11. As shown in FIG. 7*a* and FIG. 7*b*, dashed lines in the figures are an S parameter corresponding to a reflector with an ideal conductor (an all-metal structure). Solid lines in FIG. 7*a* and FIG. 7*b* are an S parameter corresponding to the reflector 15 with the structure of the comb teeth 152. In FIG. 7*a*, the S parameter represents a phase difference represented by a reflected wave when two different reflectors in a bandpass reflect a plane wave when the wave is incident. It can be learned from a curve in the figure that there is always a stable phase difference π/12 between the dashed line and the solid line for any frequency value. An S11 parameter of the S parameter in FIG. 7*b* represents a reflection quantity value represented by a reflected wave when two different reflectors in a bandpass reflect a plane wave when the wave is incident. It can be learned from a curve in the figure that a reflection effect of the reflector 15 with the structure of the comb teeth 152 to a radiation wave of the first radiating element 11 is improved to 1.5 dB. In another embodiment, a value of the phase difference may be adjusted through adjusting a size of the comb teeth 152 to change the concave part 1551.

In this embodiment, as shown in FIG. 3, the second antenna 20 is a dual-band radiation antenna that includes a high-frequency radiating element 22 and a low-frequency radiating element 21. To ensure that the first antenna 10 and the second antenna 20 do not interfere with each other during radiation on different operating frequency bands, it is required to ensure that the high-frequency radiating element and the low-frequency radiating element of the second antenna are orthogonally polarized to the first radiating element 11 of the first antenna 10. Specifically, the first antenna 10 is horizontally polarized, and the second antenna is vertically polarized. In this way, the two antennas are orthogonally polarized.

When the second antenna 20 is designed, orthogonal polarization between the first antenna 10 and the second antenna 20 may be first met. Further, it is required to ensure that the second antenna 20 has a high frequency band and a low frequency band. In addition, an impact of operating radiation of the second antenna 20 on a high frequency band and a low frequency band on operation of the first antenna 10 may be reduced.

For the first problem, a solution is to make extension directions of the two first radiation arms 112 of the first radiating element 11 perpendicular to extension directions of the dipole radiation arms on the high frequency band and the low frequency band in the second antenna 20.

For the second problem, an operating frequency band of a dipole unit is closely related to an extension length of the radiation arm. Lengths of the radiation arms in the second antenna 20 can be adjusted to obtain dipole units on the high frequency band and the low frequency band.

For the third problem, there are at least two dipole units in the second antenna 20, that is, one high-frequency dipole unit 22 and one low-frequency dipole unit 21. The extension directions of the two dipole units may be perpendicular to a polarization direction of the first radiation arm 112 of the first radiating element 11. To reduce an impact of operating radiation of the second antenna 20 on the high frequency band and the low frequency band on the operation of the first antenna 10, the high-frequency dipole unit 22 and the low-frequency dipole unit 21 may be symmetrically distributed. As shown in FIG. 3, the two first radiation arms 112 of the first radiating element 11 are symmetrical about the first axis X, and the two high-frequency dipole units 22 and the two low-frequency dipole units 21 of the second antenna 20 are also symmetrical about the first axis X. Because the two high-frequency dipole units 22 are distributed symmetrically to the first axis X, and sizes of the two high-frequency dipole units 22 are the same, impact of the two high-frequency dipole units 22 on the first antenna 10 is minimized according to a principle of symmetry. Similarly, the impact, on the first antenna 10, of the two low-frequency dipole units 21 distributed symmetrically to the first axis X is also minimized.

The second antenna 20 orthogonally polarized to the first antenna 10 can be obtained based on the foregoing design. As shown in FIG. 1, the second antenna 20 in this embodiment is the dual-band antenna formed by the dipole units. Operating frequency bands of the two dipole units are a high frequency, and operating frequency bands of the two dipole units are a low frequency. Both the two high-frequency dipole units 22 and the two low-frequency dipole units 21 are symmetrical to the first axis X. The second antenna 20 formed in this way may be orthogonally polarized to the first antenna 10. In addition, the second antenna 20 may also operate on two different frequency bands. An application scenario of this embodiment is a home wireless network. A common operating frequency band is a low frequency Wi-Fi 2.45G and a high frequency Wi-Fi 5G. In another scenario, the high frequency may correspond to Wi-Fi 6G. A specific high-frequency operating frequency band may be determined according to an actual requirement.

To better understand the beneficial effects of the reflector 15 with the comb teeth 152 in the first antenna 10 and the second antenna 20 in the embodiment, the following provides description with reference to the current distribution of the antenna 100, the S parameter, and the directivity pattern.

Figure 8A:
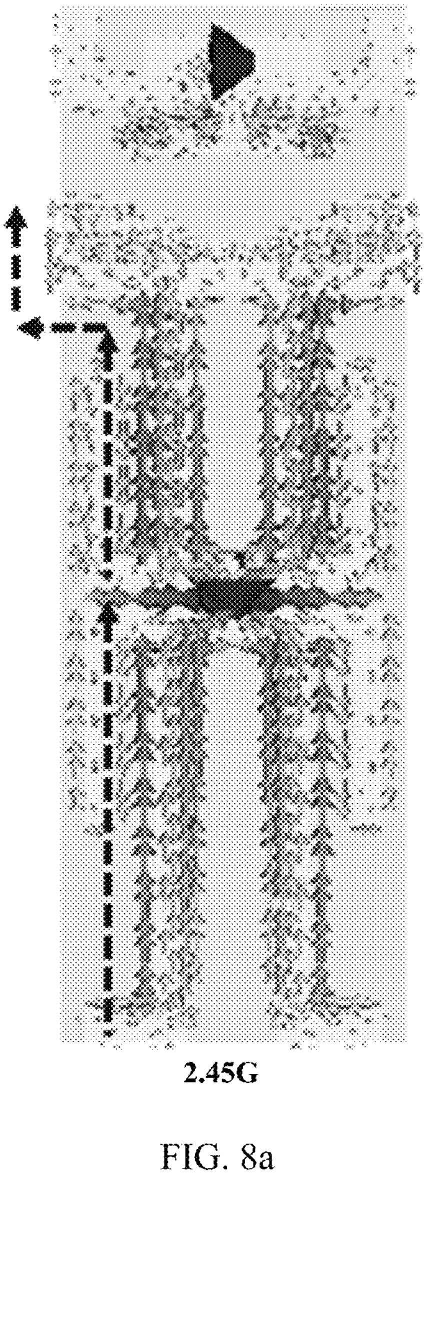
FIG. 8*a* is a current distribution diagram of a low-frequency radiating element of a second antenna in an antenna according to an embodiment of this application.
Figure 8B:
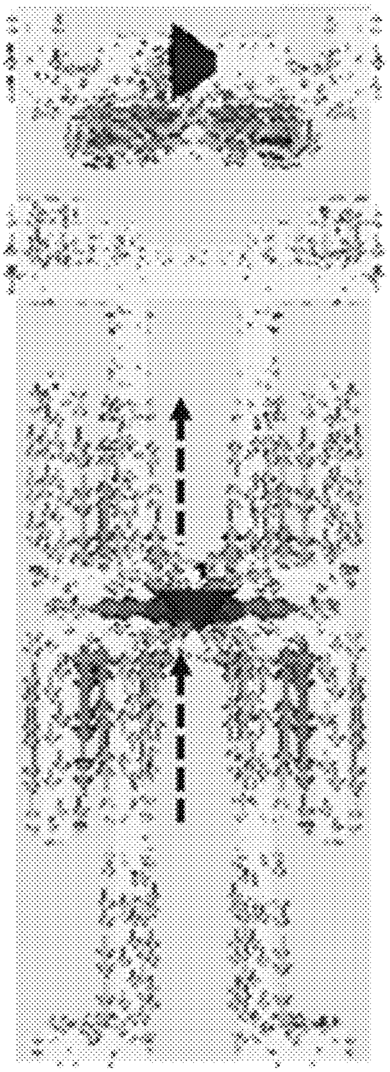
FIG. 8*b* is a current distribution diagram of a high-frequency radiating element of a second antenna in an antenna according to an embodiment of this application.
Figure 8C:
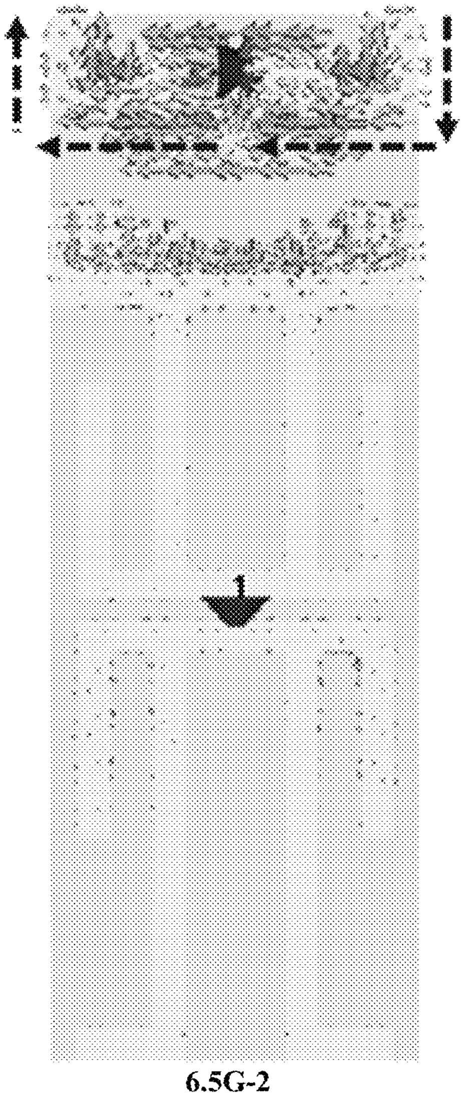
FIG. 8*c* is a current distribution diagram of a first radiating element of a first antenna in an antenna according to an embodiment of this application.

With reference to FIG. 8*a* to FIG. 8*c*, arrow distribution in the figure is surface current distribution of the first antenna 10 and the second antenna 20. The figures show current distribution of the first radiating element 11 and the radiating element in the second antenna 20 at a corresponding operating frequency. A current distribution diagram in FIG. 8*a* shows current distribution and current directions of the second antenna 20 on a 2.5G low frequency band. It can be learned from the figure that a main operating element in the second antenna 20 is the low-frequency dipole unit 21, and currents are distributed to the radiation arms of the low-frequency dipole unit 21. A current distribution diagram in FIG. 8*b* shows current distribution and current directions of the second antenna 20 on a 6.5G second high frequency band. It can be learned from the diagram that in this case, a main operating element in the second antenna 20 is the high-frequency dipole unit 22, and currents are distributed to the radiation arms of the high-frequency dipole unit 22. A current distribution diagram in FIG. 8*c* shows current distribution and current directions of the first antenna 10 on a 6.5G high frequency band. It can be learned from the diagram that in this case, a main operating element in the second antenna 20 is the first radiating element 11, and currents are distributed to the first radiation arms 112 of the first radiating element 11. It may be learned from comparison of the three current distribution diagrams that in FIG. 8*a* and FIG. 8*b*, no current or only a small current is distributed to the first antenna 10; and in FIG. 8*c*, no current is distributed to the second antenna 20. Therefore, it can be learned that polarization is well implemented on the first antenna 10 and the second antenna 20. The first antenna 10 and the second antenna 20 operating on different frequency bands have independent current distribution, and have relatively small mutual impact.

Figure 9A:
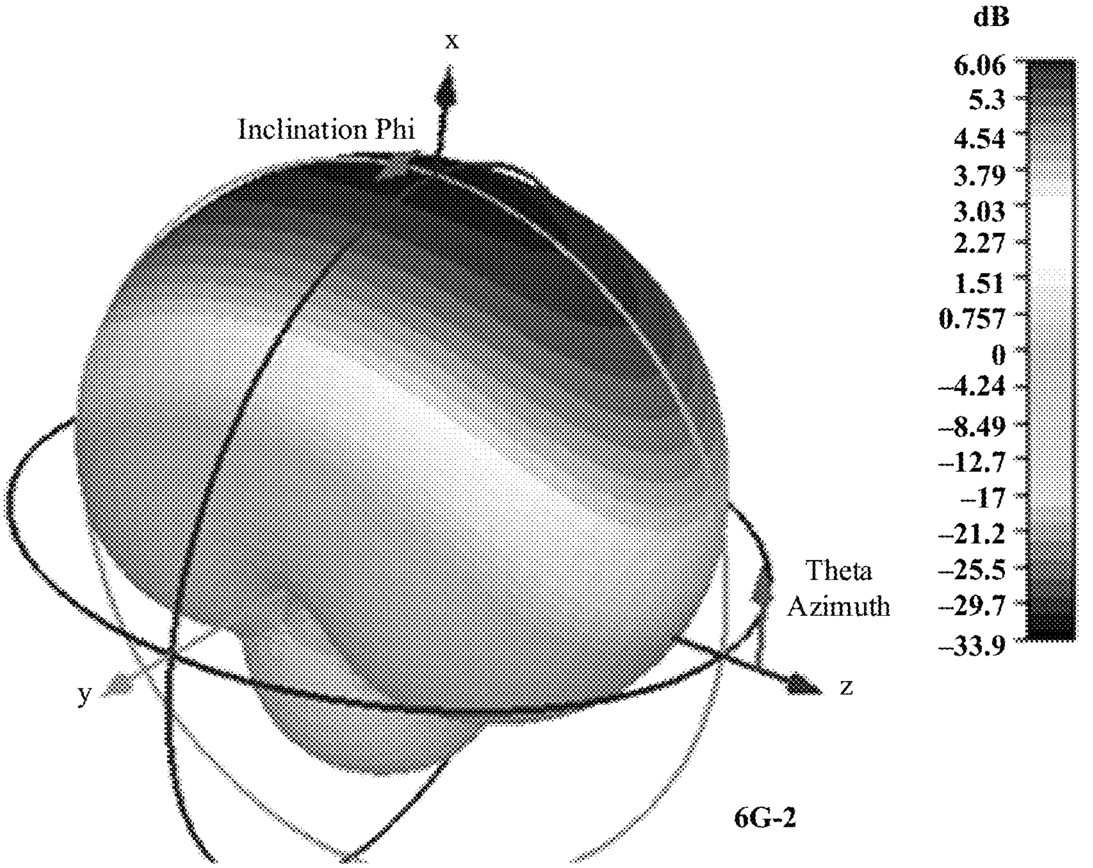
FIG. 9*a* is a directivity pattern of directional radiation of a first antenna in an antenna according to an embodiment of this application.
Figure 9B:
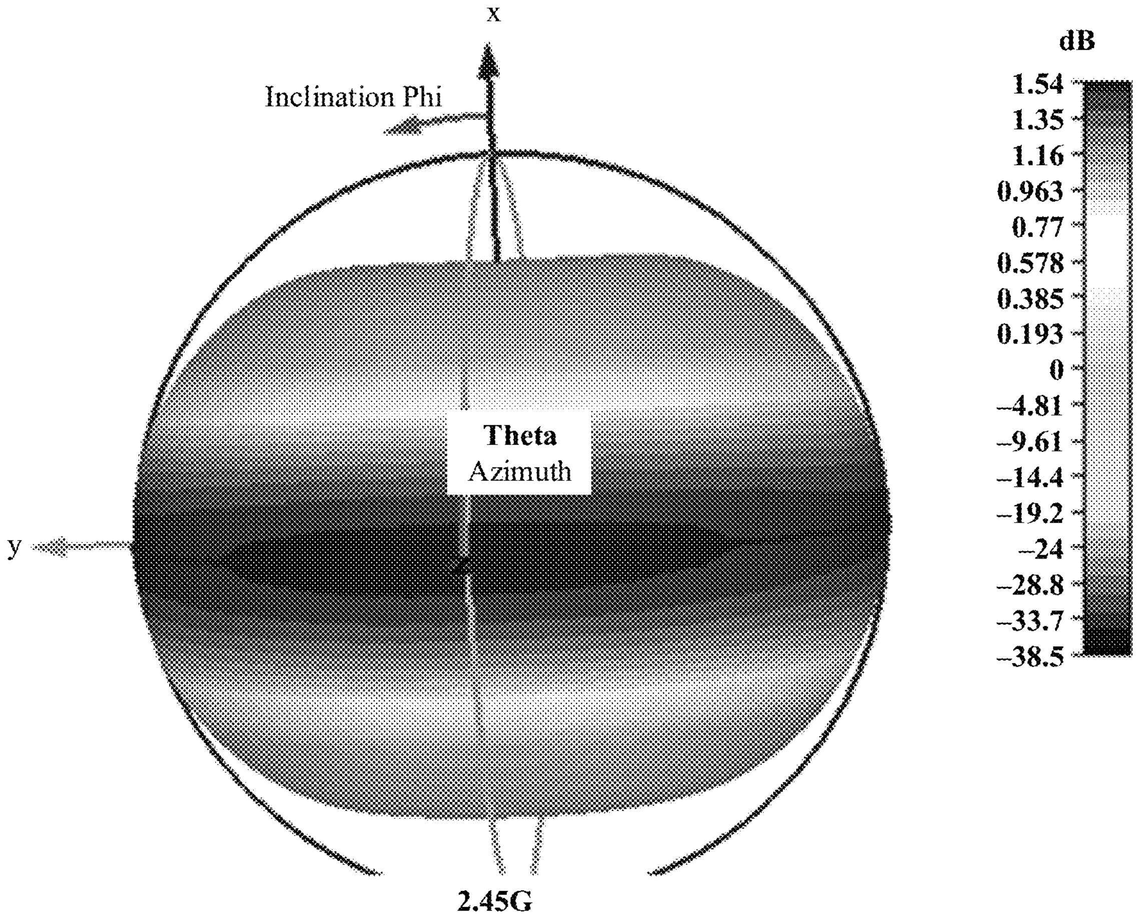
FIG. 9*b* is a radiation directivity pattern of a low-frequency radiating element of a second antenna in an antenna according to an embodiment of this application.
Figure 9C:
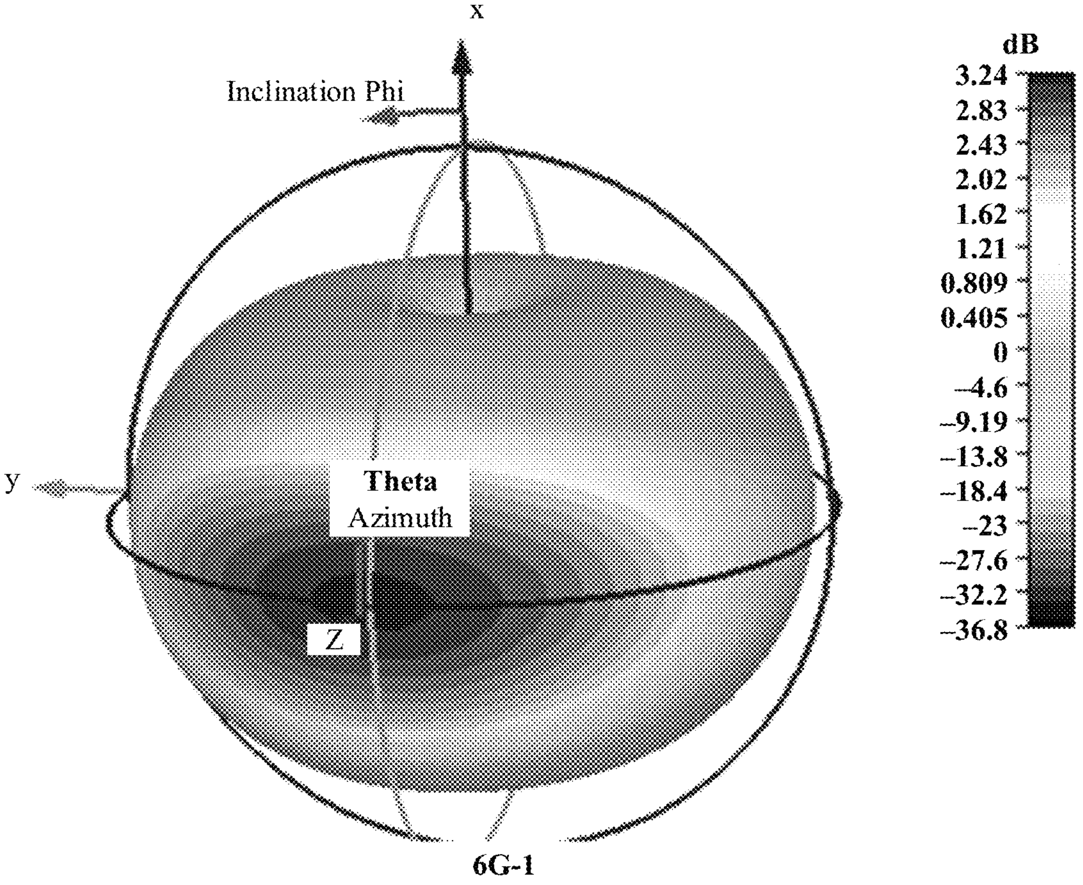
FIG. 9*c* is a radiation directivity pattern of a high-frequency radiating element of a second antenna in an antenna according to an embodiment of this application.

Specifically, FIG. 9*a*, FIG. 9*b*, and FIG. 9*c* are antenna radiation directivity patterns of the first antenna 10 and the second antenna 20 at corresponding frequencies. FIG. 9*a* is a directivity pattern of the first antenna 10. It can be learned from the directivity pattern that the horizontally polarized first antenna 10 has an upward directional radiation feature. FIG. 9*b* is a directivity pattern of the low-frequency radiating element 21 of the second antenna 20. FIG. 9*c* is a directivity pattern of the high-frequency radiating element 22 of the second antenna 20. It can be learned that the vertically polarized second antenna 20 has omnidirectional radiation performance similar to a dipole. A radiation directivity pattern of the second antenna 20 is basically consistent with a conventional single-band or dual-band dipole antenna. Therefore, the antenna 100 that includes the first antenna 10 and the second antenna 20 has the directional radiation performance (of the first antenna 10) in a vertical direction and the omnidirectional radiation performance (of the second antenna 20) in a horizontal direction.

Figure 10:
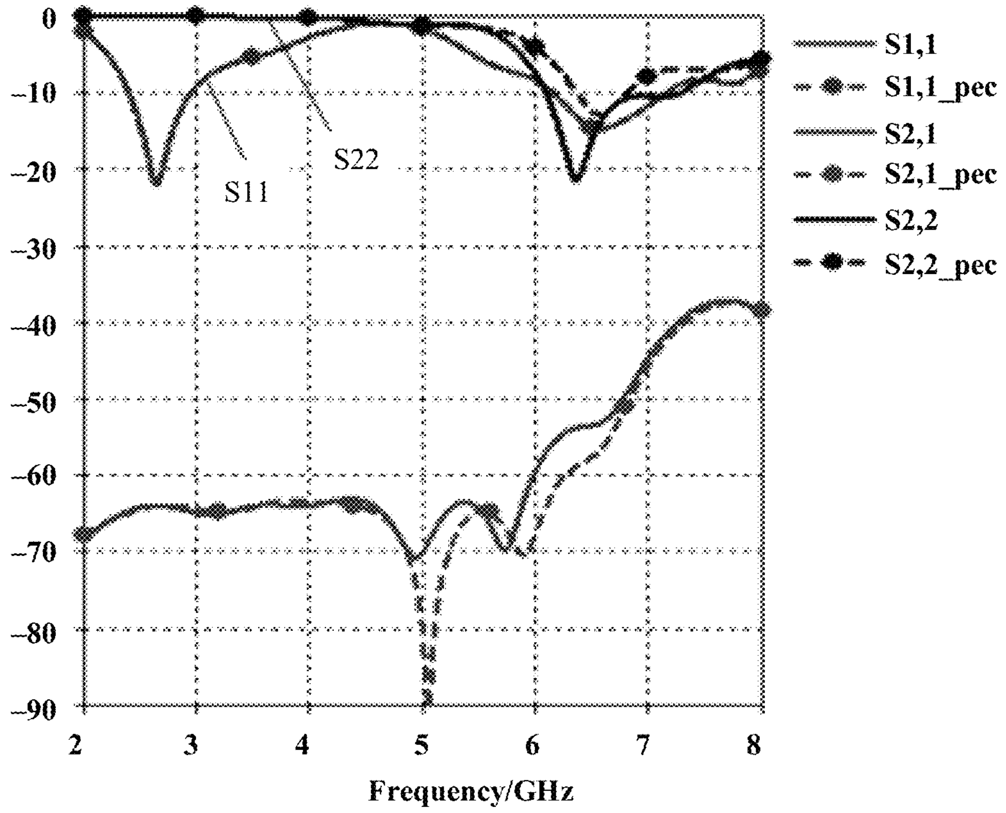
FIG. 10 is a curve diagram of a return loss of an antenna according to an embodiment of this application.

As shown in FIG. 10, curves in the figure are mainly return loss curves S11 and S22 of the antenna 100. A port 1 is an antenna feed interface that includes a low frequency 2.45G and a high frequency 6.5G-1, and corresponds to the second antenna 20. A port 2 is an antenna feed interface that includes a high frequency 6.5G-2, and corresponds to the first antenna 10. It can be learned from the return loss curves S11 and S22 of the antenna in the figure that S11 corresponds to two dimples, and corresponds to a resonance band (less than ~10 dB) of two frequencies, that is, an operating frequency band of the second antenna 20 covers a low frequency (2.45G) and a high frequency (6.5G-1). Values of vertical coordinates on only one curve segment of S22 are less than −10 dB, and correspond to only one resonance band, that is, the first antenna 1 has a high-frequency (6.5G-2) operating frequency band. At the same time, a dash-dot line in the figure represents a reflector using an ideal conductor structure (a conventional all-metal structure), and a solid line represents the reflector 15 using the structure of the comb teeth 152. It may be learned from comparison between two S22 curves that an operating bandwidth of the first antenna 10 is wider by using the reflector 15 using the structure of the comb teeth 152. For the second antenna 20, it can be learned from the figure that the second antenna 20 covers the low frequency (2.45G) and the high frequency (6.5G-1) and has a dual-band feature. Therefore, the antenna 100 including the first antenna 10 and the second antenna 20 has a tri-band dual-polarization feature.

The antenna 100 in this embodiment has the tri-band dual-polarization feature. More importantly, the reflector 15 in the first antenna 10 has the concave part 1551 having the profile with the structure of the comb teeth 152. The reflector 15 can greatly enhance a reflection effect of the reflector 15 to the radiation wave of the first radiating element 11, and strengthen the directional radiation function of the first antenna 10 in the vertical direction. In addition, the reflector 15 also isolates an impact of downward radiation of the first radiating element 11 on the vertically polarized second antenna 20.

In a possible embodiment, at least two of the plurality of comb teeth 152 have different extension lengths. The extension length herein indicates a length between a tooth root 1524 connecting the comb tooth 152 to the connection part 151 and the upper end surface 1525 of the comb tooth 152. As shown in FIG. 3 and FIG. 4, in this embodiment, the comb teeth 152 with different extension lengths form the concave part 1551 of the profile of the tooth part. The comb teeth 152 that form the concave part 1551 of the profile in this embodiment are divided into three levels: a plurality of first comb teeth 1521 with a first extension length, a plurality of second comb teeth 1522 with a second extension length, and a plurality of third comb teeth 1523 with a third extension length. The first extension length is less than the second extension length, and the second extension length is less than the third extension length. In other words, the concave part 1551 of the profile formed by the comb teeth 152 is in three-level step distribution. To ensure symmetry of a reflection effect of the reflector 15 to the first radiating element 11, the tooth root 1524 of the at least one first comb tooth 1521 is connected to a central region of the connection part 151. In other words, the at least one first comb tooth 1521 is located in the central region of the entire tooth part, to form a first comb tooth region. If a quantity of first comb teeth 1521 is an odd number, one first comb tooth 1521 overlaps the first axis X, and the remaining first comb teeth 1521 are symmetrically distributed on two sides of the first comb tooth 1521 overlapping the first axis X. If a quantity of first comb teeth 1521 is an even number, the even quantity of first comb teeth 1521 are divided into two groups, and the two groups of first comb teeth 1521 are symmetrically distributed on two sides of the first axis X. For the plurality of second comb teeth 1522 with the second extension length, the plurality of second comb teeth 1522 are symmetrically distributed in the first comb tooth region formed by the at least one first comb tooth 1521. A quantity of the plurality of second comb teeth 1522 is preferably an even number. The even quantity of second comb teeth 1522 are divided into two groups. The two groups of second comb teeth 1522 are symmetrically distributed on two sides of the first comb tooth region. In this case, the plurality of second comb teeth 1522 distributed on the two sides of the first comb tooth region form two second comb tooth regions. For the plurality of third comb teeth 1523 with the third extension length, the plurality of third comb teeth 1523 are symmetrically distributed on two sides of the second comb tooth regions formed by the plurality of second comb teeth 1522. A quantity of the plurality of second comb teeth 1522 is preferably an even number. The even quantity of third comb teeth 1523 are divided into two groups. The two groups of third comb teeth 1523 are symmetrically distributed on the two sides of the second comb tooth regions. In this case, the plurality of third comb teeth 1523 distributed on the two sides form two third comb tooth regions. Because the first comb region, the second comb regions, and the third comb regions have different extension lengths, a boundary profile formed by the first comb region, the second comb regions, and the third comb regions is three-level steps concave in the middle. In other words, the concave part 1551 of the profile is formed. A reflection convergence effect of the reflector 15 for the radiation wave of the first radiating element 11 is implemented by using the concave part 1551 of the step-like profile, to enhance a directional radiation function of the first radiating element 11. In the foregoing embodiment, a surface of the connection part 151 away from the tooth part 155 is a first surface 1511. The first surface 1511 is planar. Vertical distances are the same between each of the tooth roots 1524 of the comb teeth 152 on the connection part 151 and the first surface 1511. In this embodiment, the comb teeth 152 with different heights are designed. In this way, the tooth roots 1524 are aligned, and tooth crowns 1527 are distributed in different heights, to form the concave part 1551 of the profile on the side of the tooth part 155 facing the first radiating element 11. In an embodiment, the extension length of the first comb tooth 1521 may be zero. In this case, a second surface 1512 of this region implements a reflection function.

Figure 11:
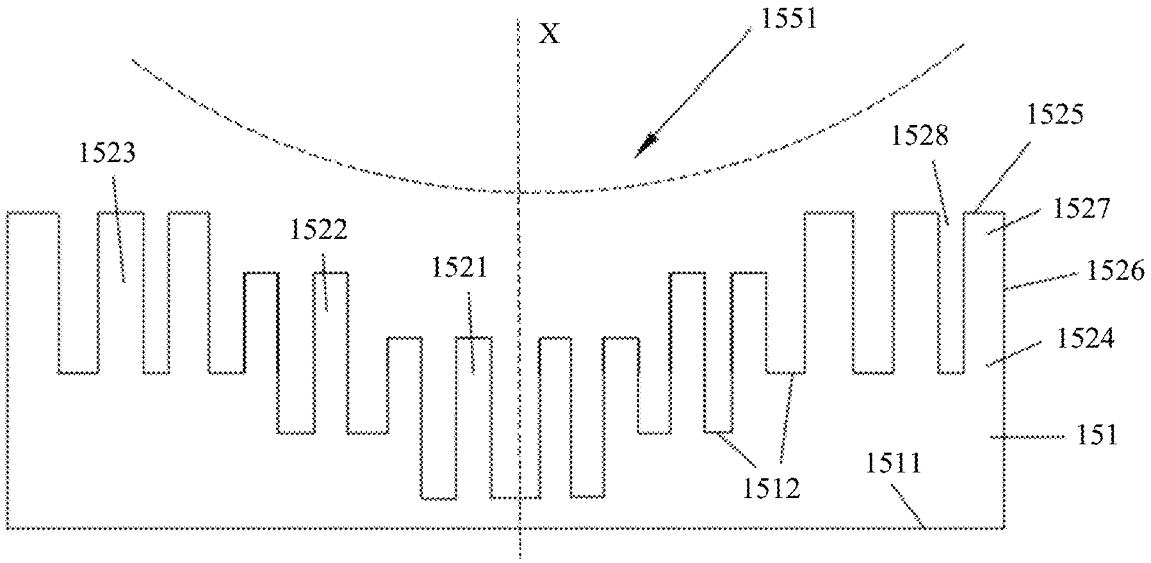
FIG. 11 is a diagram of a structure of a second reflector in an antenna according to an embodiment of this application.

In another possible embodiment, as shown in FIG. 11, the plurality of shown comb teeth 152 have the same extension length. In other words, the first comb teeth 1521, the second comb teeth 1522, and the third comb teeth 1523 have the same extension length. In this case, a shape of the profile of the second surface 1512 of the comb teeth 152 connected by using the connection part 151 is the same as a profile on a side of the tooth part 155 facing the first radiating element 11. The concave part 1551 of the corresponding profile may be obtained through adjusting only the shape of the profile of the second surface 1512. The plurality of comb teeth 152 are designed as the same shape and the same size. It is easy to process the comb teeth 152 with the same specification. Specifically, when the reflector 15 is a three-dimensional structure, the connection part 151 and the comb teeth 152 may be manufactured separately. In this case, it is easy to uniformly manufacture the plurality of comb teeth 152 with the same size. Then, the comb teeth 152 are fastened to the second surface 1512 of the connection part 151. The comb teeth 152 may be fastened through welding, bonding, or magnetic attachment, to form the concave part 1551 of the profile on the side of the tooth part 155 facing the first radiating element 11.

In the foregoing two embodiments, the concave part 1551 of the profile is mainly formed in a case in which the comb teeth 152 have the same extension length and a case in which the comb teeth 152 have different extension lengths. When the comb teeth 152 have different extension lengths, the concave part 1551 of the profile on the side of the tooth part 155 facing the first radiating element 11 may be obtained only through distributing the comb teeth 152 with different extension lengths in a manner of a small extension length in the middle and a large extension length on two sides. When the comb teeth 152 have the same extension length, the concave part 1551 of the profile on the side of the tooth part 155 facing the first radiating element 11 is implemented only through adjusting a shape of the connection part 151. An example of an adjustment manner is as follows: A second plane 1512 of the tooth roots 1524 connected to the connection part 151 is designed as a concave surface, so that the comb teeth 152 with the same extension length can form the concave part 1551 of the profile corresponding to the concave surface. In this embodiment, in order that the current is evenly distributed to the comb tooth 152, the two sidewalls 1526 of the comb tooth 152 are parallel to the extension direction of the comb tooth 152. It can be learned from FIG. 6*a* and FIG. 6*b* that current distribution in the reflector 15 is closely related to the comb teeth 152. For a metal conductor, a moving charge in the metal conductor is always distributed on an outer sidewall. Therefore, a direction of the sidewall 1526 of the comb tooth 152 greatly affects the current distribution in the comb tooth 152. In order that the current is evenly distributed to the comb tooth 152, to ensure enhancement of directional radiation of the reflector 15 to the first radiating element 11, the two sidewalls 1526 of the comb tooth 152 in this embodiment are disposed in a manner of being parallel to the extension direction of the comb tooth 152.

In the foregoing embodiment, as shown in FIG. 5 and FIG. 11, the concave part 1551 of the profile is in a step shape. In this case, the comb tooth 152 is usually cuboid or rectangular. Each comb tooth 152 includes an upper end surface 1525 (or an end edge) and sidewalls 1526 (or side edges) connected between the upper end surface 1525 (or the end edge) and the tooth root 1524. In this embodiment, the upper end surface 1525 (the end edge) is a plane (a straight line), and the sidewalls 1526 (the side edges) are parallel to the first axis X. In this way, step-like arrangement is formed among the tooth crowns 1527 of the comb teeth with different extension lengths, to form the step-like concave part 1551 of the profile on the side of the tooth part 155 facing the first radiating element 11. For a substrate printed antenna, the antenna 100 is printed on the substrate 140. A thickness of the antenna 100 is very small. The upper end surface 1525 and the sidewalls 1526 of the comb tooth 152 may be understood as the end edge 1525 and the side edges 1526.

Figure 12:
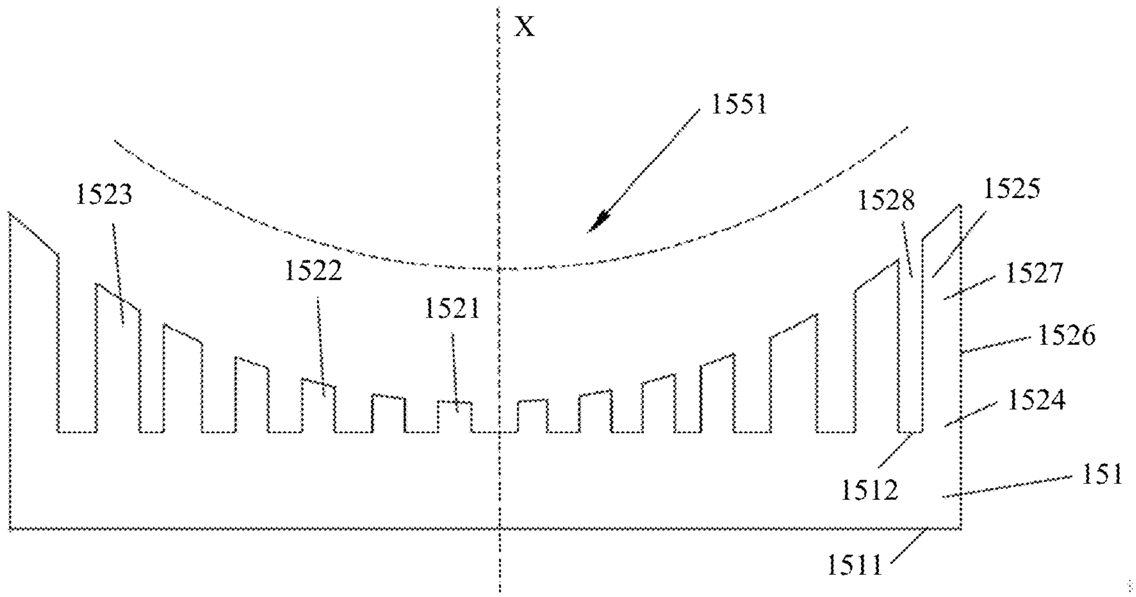
FIG. 12 is a diagram of a structure of a third reflector in an antenna according to an embodiment of this application.

In another embodiment, as shown in FIG. 12, the concave part 1551 includes a smoothly transited arc. Each comb tooth 152 includes an upper end surface 1525 (or an end edge) facing the first radiating element 11 and sidewalls 1526 (side edges) connected between the upper end surface 1525 (or the end edge) and a tooth root 1524. The two sidewalls 1526 (the side edges) have different sizes. The end surface 1525 (the end edge) extends in an inclined direction relative to the extension direction of the comb tooth 152. In other words, an included angle between the upper end surface 1525 (or the end edge) and one of the sidewalls 1526 (or the side edges) is an acute angle. The upper end surface 1525 (the end edge) may be an inclined plane (a straight line) or an arc surface (an arc). A plurality of inclined planes (straight lines) or arc surfaces (arcs) jointly form the smoothly transited arc concave part 1551.

In another embodiment, the concave part 1551 includes a straight line with an acute angle as an inclined angle to the extension direction of the comb teeth 152, or the concave part 1551 includes a combination of a straight line with an acute angle as an inclined angle to the extension direction of the comb teeth 152 and a straight line perpendicular to the extension direction, or the concave part 1551 includes a combination of a straight line with an acute angle as an inclined angle to the extension direction of the comb teeth 152 and a smoothly transited arc. Three designs of the concave part 1551 in the figure are to enhance the directional radiation of the reflector 15 to the first radiating element 11. For the concave part 1551, there may be a plurality of concave manners. For example, the concave part 1551 shown in the figure includes an inclined straight line, or may include an arc, or may include a combination of an inclined straight line and an arc. Regardless of a combination manner, a purpose of the combination is to construct the concave part 1551 of the profile for the tooth part 155, so that a reflective concave surface of the first radiating element 11 is generally formed.

In the foregoing embodiment, the extension length of the comb tooth 152 does not exceed a quarter of a wavelength corresponding to a resonance center frequency of the first radiating element 11. As shown in FIG. 8*c* and FIG. 10, a high frequency band of the first radiating element 11 is close to 6G. For the comb tooth 152, a maximum value of the extension length of the comb tooth 152 cannot exceed a quarter of a wavelength corresponding to a 6G high frequency band center frequency. Specifically, a third-layer step concave part is used as an example. The extension length of the third comb tooth 1523 cannot exceed a quarter of the wavelength corresponding to the 6G high frequency band center frequency. If the extension length of the third comb tooth 1523 reaches a quarter of the wavelength corresponding to the 6G high frequency band center frequency, a resonance frequency of the third comb tooth 1523 is close to a frequency of a radiation wave. In this case, the third comb tooth 1523 receives but does not reflect the electromagnetic wave radiated by the first radiating element 11. Similarly, if the extension length of the third comb tooth 1523 is greater than a quarter of the wavelength corresponding to the 6G high frequency band center frequency, resonance occurs on another comb tooth 152 whose extension length is less than the extension length of the third comb tooth 1523, which further affects enhancement of the directional radiation of the reflector 15 to the first radiating element 11. As shown in FIG. 5, widths of different comb teeth 152 are consistent with gaps between different comb teeth 152. In this way, reflection effects of different comb teeth 152 in the extension direction are consistent. Specific values of the widths of different comb teeth 152 and specific values of the gaps between different comb teeth 152 are less than a tenth of a wavelength corresponding to a resonance center frequency of the first radiating element 11. In an embodiment, a bandwidth and a gain of the first radiating element may be analyzed by using simulation software, to obtain a proper width and a proper gap of the comb tooth 152. In an embodiment, for the step structure design of the comb teeth, the width of each comb tooth 152 does not exceed a tenth of the wavelength corresponding to the resonance center frequency of the first radiating element 11, in consideration of a minimum two-step change and a width size of the entire reflector. In an example of a high frequency 6.5G, the width of the reflector 15 is a half of the wavelength: 23 mm. In this case, the step comb tooth structure requires widths of at least three comb teeth 152 and at least two tooth gaps 1528. A total of five width values are considered, that is, a maximum of the width of each tooth gap is a tenth of the wavelength: 4.6 mm.

Figure 13:
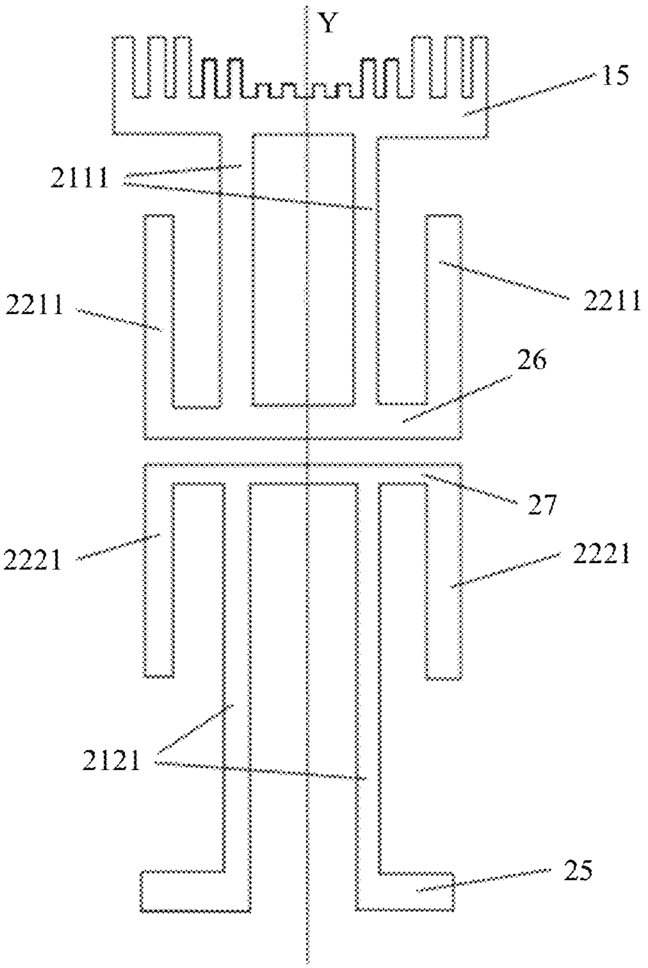
FIG. 13 is a diagram of a structure of a connection between a second antenna and a reflector in an antenna according to an embodiment of this application.

In an implementable embodiment, as shown in FIG. 3 and FIG. 13, the connection part 151 is connected to the second antenna 20. The high-frequency radiating element 22 includes a high-frequency upper radiator 221 and a high-frequency lower radiator 222, and the low-frequency radiating element 21 includes a low-frequency upper radiator 211 and a low-frequency lower radiator 212. The high-frequency upper radiator 221 is connected to the low-frequency upper radiator 211. The high-frequency upper radiator 221 is distributed on two sides of the low-frequency upper radiator 211. The high-frequency lower radiator 222 is connected to the low-frequency lower radiator 212. The high-frequency lower radiator 222 is distributed on two sides of the low-frequency lower radiator 212. The connection part 151 of the reflector 15 is connected to the low-frequency upper radiator 211. The high-frequency lower radiator 222 and the low-frequency lower radiator 212 form a lower branch. The high-frequency upper radiator 221 and the low-frequency upper radiator 211 form an upper branch. The upper branch is located between the reflector 15 and the lower branch. After the connection part 151 of the reflector 15 is connected to the low-frequency upper radiator 211, a structure of the second antenna 20 is asymmetrical but the second antenna 20 has symmetrical current distribution with a dipole-like radiation feature. It can be learned from the figure that a key of connecting the reflector 15 to the low-frequency upper radiator 211 is to ensure symmetrical current distribution on the second antenna 20. To ensure that the horizontally polarized first radiating element 11 in the first antenna 10 does not affect the vertically polarized low-frequency dipole unit 21 in the second antenna 20 to implement a highly integrated design of the antenna 100, based on integrated architecture of orthogonally polarization and even current distribution, the structure is to obtain a polarization diversity and a space diversity with highly separation between the first radiating element 11 and the second antenna 20, combine the reflector 15 and an end of the low-frequency upper radiator 211, and implement an integrated tri-band dual-polarized double-fed design of a symmetrical dual-frequency dipole and a high-gain directional antenna. Specifically, the second antenna 20 is a symmetrical structure centered on a second axis Y. The low-frequency upper radiator 211 includes two radiation arms 2111 that are symmetrically distributed on two sides of the second axis Y and whose extension directions are parallel to the second axis Y. The high-frequency upper radiator 221 includes two radiation arms 2211 that are symmetrically distributed on two sides of the second axis Y and whose extension directions are parallel to the second axis Y. Ends of the radiation arms 2211 of the high-frequency upper radiator 221 facing the lower branch are connected, by using a first connection arm 26, to ends of the radiation arms 2111 of the low-frequency upper radiator 211 facing the lower branch. The first connection arm 26 is perpendicular to the second axis Y. The low-frequency lower radiator 212 includes two radiation arms 2121 that are symmetrically distributed on two sides of the second axis Y and whose extension directions are parallel to the second axis Y. The high-frequency lower radiator 222 includes two radiation arms 2211 that are symmetrically distributed on two sides of the second axis Y and whose extension directions are parallel to the second axis Y. Ends of the radiation arms 2211 of the high-frequency lower radiator 221 facing the upper branch are connected, by using a second connection arm 27, to ends of the radiation arms 2121 of the low-frequency lower radiator 212 facing the upper branch. The second connection arm 27 is parallel to the first connection arm. The first connection arm 26 and the second connection arm 27 connect the radiation arms in the high-frequency dipole unit 22 and the low-frequency dipole unit 21 close to the first antenna 10, and connect the radiation arms in the high-frequency dipole unit 22 and the low-frequency dipole unit 21 away from the first antenna 10. In this design, symmetrical current distribution on the radiation arms of the second antenna 20 can be ensured, thereby further facilitating an integrated design of the second antenna 20 and reducing a size of the second antenna 20. In an embodiment, to ensure orthogonal polarization between the first antenna 10 and the second antenna 20, the first axis X of the first antenna 10 overlaps the second axis Y of the second antenna 20.

In a possible embodiment, as shown in FIG. 3, a value of a distance d between the connection part 151 of the antenna 100 and the first radiating element 11 is less than a quarter of a sum of a wavelength of the first radiating element 11 and a low-frequency resonance wavelength of the low-frequency radiating element 21 of the second antenna 20. In a directional radiation design of the first antenna 10, the distance d between the first radiating element 11 and the reflector 15 is a quarter of a wavelength corresponding to a center frequency. In this case, a phase change in a round-trip distance is 180 degrees, to meet a 360-degree change of a reflected signal and a radiated signal due to a phase inversion function of the reflector 15. Superimposing is implemented for the same phase. Therefore, the value of the distance between the connection part of the reflector and the first radiating element is less than a quarter of the sum of the resonance wavelength of the first radiating element and the low-frequency resonance wavelength of the low-frequency radiating element. An advantage of this design is that the reflector 15 does not resonate due to a radiation wave of the first antenna 10 and cause degradation of a reflection effect. As shown in FIG. 8*a* to FIG. 8*c*, when a current is distributed to the low-frequency dipole unit 21 or the high-frequency dipole unit 22 in the second antenna 20, no current is distributed to the first radiating element 11 of the first antenna 10. Similarly, when a current is distributed to the first radiating element 11 of the first antenna 10, no current is distributed to the low-frequency dipole unit 21 or the high-frequency dipole unit 22 of the second antenna 20.

In a possible embodiment, as shown in FIG. 3, a distance between the high-frequency dipole unit 22 and the first axis X is greater than a distance between the low-frequency dipole unit 21 and the first axis X. It can be learned from the figure that the radiation arm of the low-frequency dipole unit 21 is longer than the radiation arm of the high-frequency dipole unit 22, and the low-frequency radiation arm 211 may be connected to the reflector 15. Therefore, the low-frequency dipole unit 21 is designed to be closer to the first axis X, to reduce an impact of the low-frequency dipole unit 21 to the high-frequency dipole unit 22. If the low-frequency dipole unit 21 is located on the outside, after the low-frequency dipole unit 21 is connected to the reflector 15, a closed loop that encloses the high-frequency dipole unit 22 is formed, which directly causes mutual interference between the low-frequency dipole unit 21 and the high-frequency dipole unit 22.

In a possible embodiment, as shown in FIG. 3 and FIG. 14, a direction-balanced balun structure 12 is disposed on one side of the first radiating element 11 close to the second antenna 20. The balun structure 12 includes a first connection end 121, a second connection end 122, and an extension line 123 connected between the first connection end 121 and the second connection end 122. The first connection end 121 is connected to one first radiation arm 112 of the first radiating element 11, and the second connection end 122 is connected to the other first radiation arm 112 of the first radiating element 11. The first connection end 121 and the second connection end 122 are symmetrically distributed on two sides of the first axis X. An extension track of the extension line 123 may be in a shape of a rectangle, a circle, a winding, or the like. This is not limited in this application. The extension line 123 is also symmetrically distributed by using the first axis X as a center. In an embodiment, the extension line 123 forms elongated rectangular architecture. An extension direction of the rectangular architecture is perpendicular to the first axis X. For the first radiating element 11 in this embodiment, a Q value (a quality factor) of the first radiating element 11 is relatively large, which causes a problem of a narrow impedance bandwidth. A conventional method is to add a dielectric slab with a large dielectric constant or increase a thickness of a dielectric substrate, to reduce a Q value of the first radiating element 11. However, this design causes an increase in the costs and a weight. Therefore, a balanced-unbalanced conversion structure is used in this embodiment, that is, the balanced balun structure 12. In the design of the balanced balun structure 12, the entire first antenna 10 can have the same current amplitude, and impedance conversion can also be performed. The two first radiation arms 112 of the first radiating element 11 are separately connected to internal and external conductors of a feed cable. A phase difference between the two first radiation arms 112 is 180 degrees. For the first antenna 10, better symmetry of the first antenna 10 indicates a more stable phase difference. In this embodiment, two first radiation arms 112 are connected by using a 180-degree phase extension line of the balanced balun structure 12, to better maintain balance of the first antenna 10.

In a possible embodiment, as shown in FIG. 13, ends of the radiation arms 2121 of the low-frequency lower radiator 212 away from the upper branch are both connected to connection sections 25. The connection sections 25 are symmetrically distributed on two sides of the second axis Y and are collinear, to implement a small-size design of the antenna 100 on the premise of meeting radiation performance.

Figure 15:
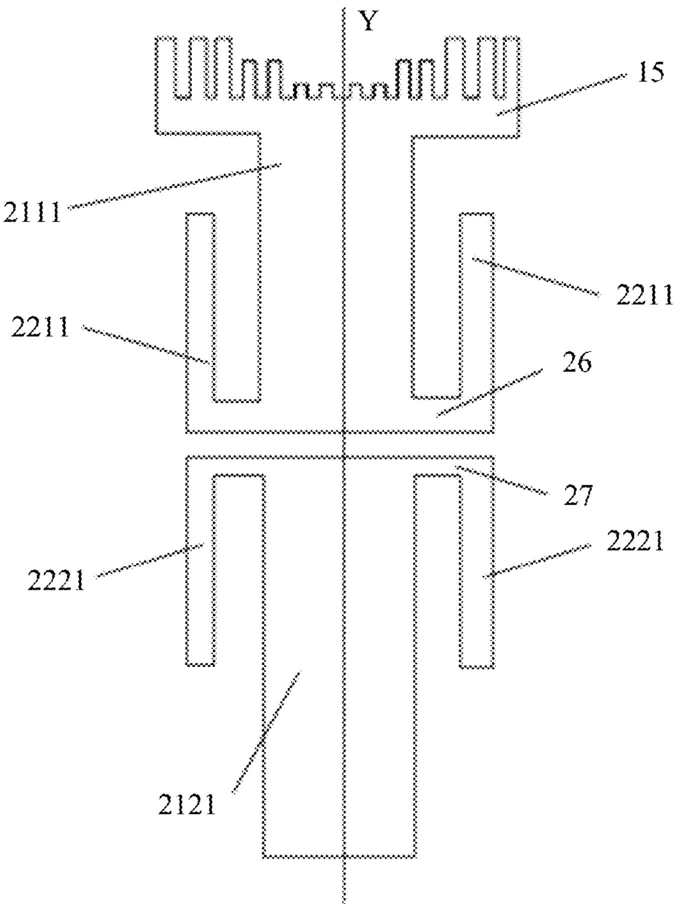
FIG. 15 is a diagram of a structure of a second antenna in an antenna according to an embodiment of this application.

In another possible embodiment, as shown in FIG. 15, the second antenna 20 is a symmetrical structure centered on a second axis Y. The low-frequency upper radiator 211 and the low-frequency lower radiator 212 are both rectangular structures 2111/2121 with the second axis Y as a symmetrical center. A long-edge direction of the rectangular structure 2111/2121 is parallel to the second axis Y. The high-frequency upper radiator 221 includes two radiation arms 2211 that are symmetrically distributed on two sides of the second axis and whose extension directions are parallel to the second axis Y. Ends of the radiation arms 2211 of the high-frequency upper radiator 221 facing the lower branch are connected, by using a first connection arm 26, to ends of the low-frequency upper radiator 211 facing the lower branch. The first connection arm 26 is perpendicular to the second axis Y and is collinear. The high-frequency lower radiator 222 includes two radiation arms 2221 that are symmetrically distributed on two sides of the second axis Y and whose extension directions are parallel to the second axis Y. Ends of the radiation arms 2221 of the low-frequency lower radiator 212 facing the upper branch are connected, by using a second connection arm 27, to ends of the low-frequency lower radiator 212 facing the upper branch. The second connection arm 27 is perpendicular to the second axis Y and is collinear. In this embodiment, the radiation arms 2211 of the high-frequency upper radiator 221 and the rectangular structures 2111 of the low-frequency upper radiator 211 are cascaded by using the first connection arm 26, and the radiation arms 2121 of the low-frequency lower radiator 212 and the rectangular structures 2121 of the low-frequency lower radiator 212 are cascaded by using the second connection arm 27. Then, the first connection arm 26 and the second connection arm 27 are fed, to obtain the high-frequency radiating element 22 and the low-frequency radiating element 21 that can be separated from each other, so that the high-frequency radiating element 22 and the low-frequency radiating element 21 have more distinct radiation effects.

Figure 16:
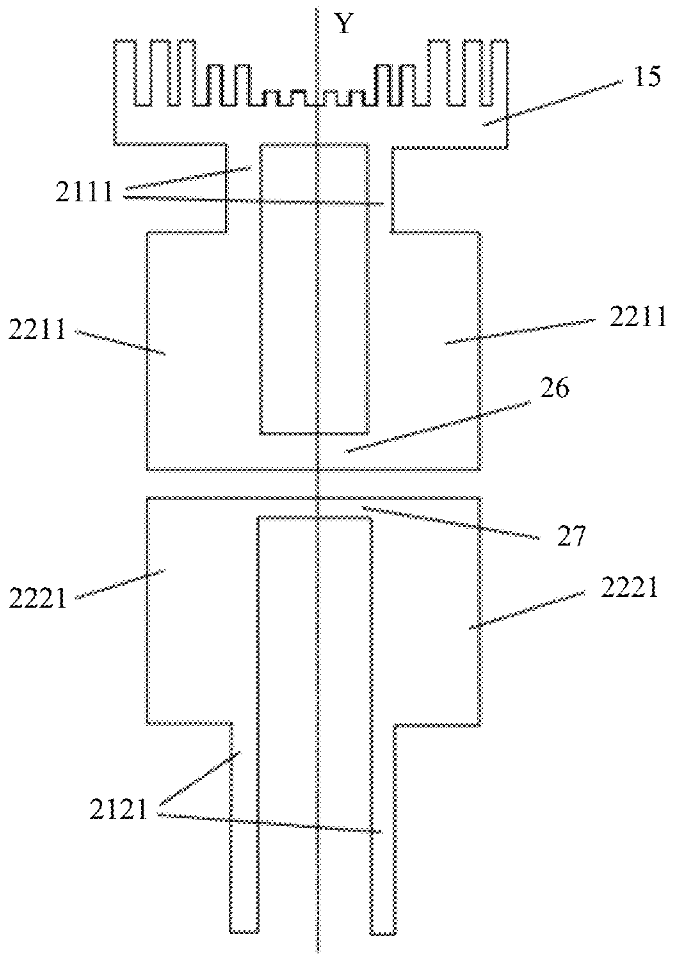
FIG. 16 is a diagram of a structure of a second antenna in an antenna according to an embodiment of this application.

In another possible embodiment, as shown in FIG. 16, the second antenna 20 is a symmetrical structure centered on a second axis Y. The low-frequency upper radiator 211 includes two radiation arms 2111 that are symmetrically distributed on two sides of the second axis Y and whose extension directions are parallel to the second axis Y. The high-frequency upper radiator 221 includes two radiation arms 2211 that are symmetrically distributed on two sides of the second axis Y and whose extension directions are parallel to the second axis Y. The radiation arms 2211 of the high-frequency upper radiator 221 are integrally connected to the radiation arms 2111 of the low-frequency upper radiator 211. Ends of the radiation arms 2111 of the low-frequency upper radiator 211 facing the lower branch are connected by using a first connection arm 26. The first connection arm 26 is perpendicular to the second axis Y. The low-frequency lower radiator 212 includes two radiation arms 2121 that are symmetrically distributed on two sides of the second axis Y and whose extension directions are parallel to the second axis Y. The high-frequency lower radiator 222 includes two radiation arms 2221 that are symmetrically distributed on two sides of the second axis Y and whose extension directions are parallel to the second axis Y. The radiation arms 2221 of the high-frequency lower radiator 222 are integrally connected to the radiation arms 2121 of the low-frequency lower radiator 212. Ends of the radiation arms 2121 of the low-frequency lower radiator 212 facing the upper branch are connected by using the second connection arm 27. The second connection arm 27 is parallel to the first connection arm 26. In this embodiment, the radiation arms 2211 of the high-frequency upper radiator 221 and the radiation arms 2111 of the low-frequency upper radiator 211 are integrally connected to form a discontinuous step structure, and the radiation arms 2221 of the high-frequency lower radiator 222 and the radiation arms 2121 of the low-frequency lower radiator 212 are integrally connected to form a discontinuous step structure. In this way, a step hopping position is selected based on lengths required for different frequencies. Herein, frequency selection is related to a quarter of a wavelength of a radiation wave. In addition, feed points are respectively disposed on the first connection arm 26 and the second connection arm 27, to obtain the high-frequency radiating element 22 and the low-frequency radiating element 21 that are separated from each other, so that the high-frequency radiating element 22 and the low-frequency radiating element 21 have more distinct radiation effects.

Figure 17:
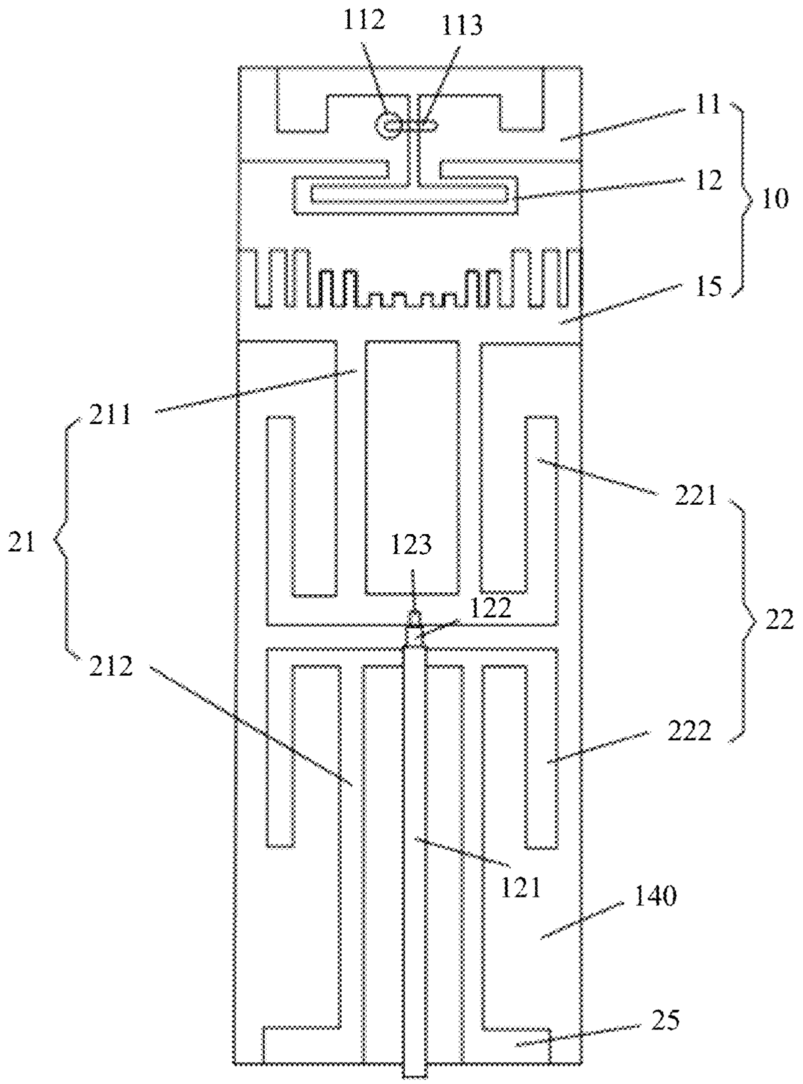
FIG. 17 is a top view of a structure of an antenna module in an antenna according to an embodiment of this application.
Figure 18:
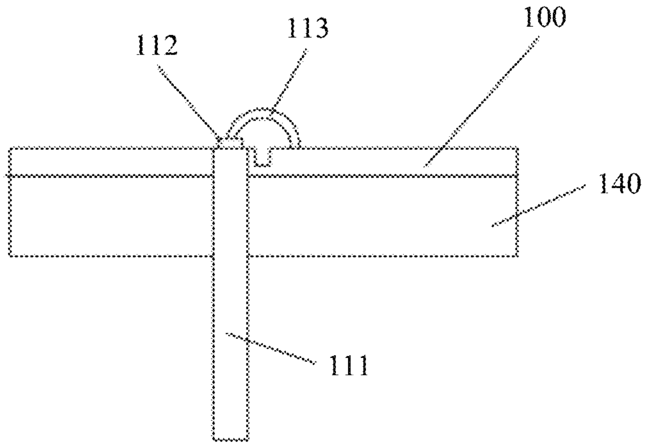
FIG. 18 is a main view of a structure of an antenna module in an antenna according to an embodiment of this application.

In addition, this application provides an antenna module 200, including a first feeder, a second feeder, and any one of the foregoing antennas 100. The first feeder is connected to a first antenna 10, and the second feeder is connected to a second antenna 20. The first antenna 10 is excited by using the first feeder to horizontally polarize the first antenna 10, and the second antenna 20 is excited by using the second feeder to vertically polarize the second antenna 20, thereby forming a tri-band dual-polarized antenna. Specifically, as shown in FIG. 4, FIG. 17, and FIG. 18, the first feeder includes a first external conductor 111, a first internal conductor 113, and a first dielectric insulation part 112. The first external conductor 111 passes through a substrate 140 and is electrically connected to a first feed point 191 of the first antenna 10. The first feed point 191 is connected to one end of the first internal conductor 113 by using the first dielectric insulation part 112. The other end of the first internal conductor 113 is electrically connected to a second feed point 192 of the first antenna 10. The second feeder includes a second external conductor 121, a second internal conductor 123, and a second dielectric insulation part 122. The second external conductor 121 and the second internal conductor 123 are attached to and disposed on the first plane. The second external conductor 121 is connected to a third feed point (not shown in the figure) of the second antenna 20. The second dielectric insulation part 122 protrudes from the third feed point. The second dielectric insulation part 122 is connected to one end of the second internal conductor 123. The other end of the second internal conductor 123 is connected to a fourth feed point of the second antenna 20. The first internal conductor is an arc bent conductor. Currents pass through the first feeder and the second feeder in this embodiment. Therefore, electromagnetic fields exist around the feeders. Due to an orthogonal design of the first feeder and the second feeder, the induction fields around the first feeder and the second feeder are also orthogonal. Mutual impact between the induction fields is the smallest, and transmission efficiency is the highest.

In an embodiment, as shown in FIG. 18, the first internal conductor 113 is an arc bent conductor. The first internal conductor 113 perpendicularly passes through the substrate 140, then is bent in an arc shape, and is connected to a right part of the first radiating element 11. A specific arc can be used to avoid excessive bending and cause damage.

What is claimed is:

1. An antenna, comprising a first antenna and a second antenna, wherein the first antenna comprises a first radiating element and a reflector, the reflector is located between the second antenna and the first radiating element, the reflector comprises a connection part and a tooth part, the tooth part comprises a plurality of comb teeth that are disposed side by side and that extend from the connection part toward the first radiating element, a gap is disposed between adjacent ones of the plurality of comb teeth, the tooth part further comprises a profile facing the first radiating element, each comb tooth comprises an end part facing the first radiating element, the profile comprises a concave part, and the concave part is concave to the connection part.

2. The antenna according to claim 1, wherein at least two of the plurality of comb teeth have different extension lengths.

3. The antenna according to claim 2, wherein the plurality of comb teeth comprise at least one first comb tooth with a first extension length and at least two second comb teeth with a second extension length, the at least two second comb teeth are symmetrically distributed on two sides of the at least one first comb tooth, and the first extension length is less than the second extension length.

4. The antenna according to claim 3, wherein the plurality of comb teeth further comprise at least two third comb teeth with a third extension length, the at least two third comb teeth are symmetrically distributed on the two sides of the at least one first comb tooth, one of the at least two second comb teeth is located between one of the at least two third comb teeth and the first comb tooth, and the third extension length is greater than the second extension length.

5. The antenna according to claim 4, wherein the tooth part is a symmetrical structure centered on a central axis, an extension direction of the central axis is the same as an extension direction of the plurality of comb teeth, and tooth roots of all the plurality of comb teeth are aligned in a direction perpendicular to the direction of the central axis.

6. The antenna according to claim 1, wherein the concave part comprises a step-like part; and/or the concave part comprises a smoothly transited arc part.

7. The antenna according to claim 1, wherein the first radiating element is horizontally polarized, the reflector and the first radiating element implement directional radiation performance of the first antenna, and the second antenna is vertically polarized.

8. The antenna according to claim 7, wherein an extension length of each of the plurality of comb teeth does not exceed a quarter of a wavelength corresponding to a resonance center frequency of the first radiating element.

9. The antenna according to claim 7, wherein a width of each of the plurality of comb teeth does not exceed a tenth of a wavelength corresponding to a resonance center frequency of the first radiating element; and/or the gap between adjacent ones of the plurality of comb teeth does not exceed the tenth of the wavelength corresponding to the resonance center frequency of the first radiating element.

10. The antenna according to claim 7, wherein the connection part is connected to the second antenna.

11. The antenna according to claim 10, wherein the second antenna comprises a high-frequency radiating element and a low-frequency radiating element, the high-frequency radiating element and the low-frequency radiating element are orthogonally polarized to the first radiating element of the first antenna, and the connection part is connected to the low-frequency radiating element.

12. The antenna according to claim 11, wherein the high-frequency radiating element comprises a high-frequency upper radiator and a high-frequency lower radiator, the low-frequency radiating element comprises a low-frequency upper radiator and a low-frequency lower radiator, the high-frequency upper radiator is connected to the low-frequency upper radiator, the high-frequency upper radiator is distributed on two sides of the low-frequency upper radiator, the high-frequency lower radiator is connected to the low-frequency lower radiator, the high-frequency lower radiator is distributed on two sides of the low-frequency lower radiator, the connection part of the reflector is connected to the low-frequency upper radiator, the high-frequency lower radiator and the low-frequency lower radiator form a lower branch, the high-frequency upper radiator and the low-frequency upper radiator form an upper branch, and the upper branch is located between the reflector and the lower branch.

13. The antenna according to claim 12, wherein the second antenna is a symmetrical structure centered on a second axis, the low-frequency upper radiator comprises two radiation arms that are symmetrically distributed on two sides of the second axis and whose extension directions are parallel to the second axis, the high-frequency upper radiator comprises two radiation arms that are symmetrically distributed on the two sides of the second axis and whose extension directions are parallel to the second axis, ends of the radiation arms of the high-frequency upper radiator facing the lower branch are connected, by using a first connection arm, to ends of the radiation arms of the low-frequency upper radiator facing the lower branch, and the first connection arm is perpendicular to the second axis.

14. The antenna according to claim 13, wherein a value of a distance between the connection part and the first radiating element is less than a quarter of a sum of a resonance wavelength of the first radiating element and a low-frequency resonance wavelength of the low-frequency radiating element.

15. An antenna module, comprising a first feeder, a second feeder, and an antenna, wherein the antenna comprises a first antenna and a second antenna, wherein the first antenna comprises a first radiating element and a reflector, the reflector is located between the second antenna and the first radiating element, the reflector comprises a connection part and a tooth part, the tooth part comprises a plurality of comb teeth that are disposed side by side and that extend from the connection part toward the first radiating element, a gap is disposed between adjacent ones of the plurality of comb teeth, the tooth part further comprises a profile facing the first radiating element, each comb tooth comprises an end part facing the first radiating element, the profile comprises a concave part, and the concave part is concave to the connection part, and wherein the first feeder is connected to the first antenna, and the second feeder is connected to the second antenna.

16. The antenna module according to claim 15, wherein the antenna is located on a first plane, the first feeder is perpendicular to the first plane, and the second feeder is parallel to the first plane.

17. A wireless network device, comprising a feeding network and an antenna module, wherein the antenna module comprises a first feeder, a second feeder, and an antenna, wherein the antenna comprises a first antenna and a second antenna, wherein the first antenna comprises a first radiating element and a reflector, the reflector is located between the second antenna and the first radiating element, the reflector comprises a connection part and a tooth part, the tooth part comprises a plurality of comb teeth that are disposed side by side and that extend from the connection part toward the first radiating element, a gap is disposed between adjacent ones of the plurality of comb teeth, the tooth part further comprises a profile facing the first radiating element, each comb tooth comprises an end part facing the first radiating element, the profile comprises a concave part, and the concave part is concave to the connection part, wherein the first feeder is connected to the first antenna, and the second feeder is connected to the second antenna, and wherein the feeding network is connected to a first feeder and a second feeder of the antenna module, to excite the first antenna and the second antenna.

18. The wireless network device according to claim 17, wherein the plurality of comb teeth comprise at least one first comb tooth with a first extension length and at least two second comb teeth with a second extension length that is different from the first extension length, the at least two second comb teeth are symmetrically distributed on two sides of the at least one first comb tooth, and the first extension length is less than the second extension length.

19. The wireless network device according to claim 18, wherein the plurality of comb teeth further comprise at least two third comb teeth with a third extension length, the at least two third comb teeth are symmetrically distributed on the two sides of the at least one first comb tooth, one of the at least two second comb teeth is located between one of the at least two third comb teeth and the first comb tooth, and the third extension length is greater than the second extension length.

20. The wireless network device according to claim 19, wherein the tooth part is a symmetrical structure centered on a central axis, an extension direction of the central axis is the same as an extension direction of the plurality of comb teeth, and tooth roots of all the plurality of comb teeth are aligned in a direction perpendicular to the direction of the central axis.

* * * * *